(12) United States Patent
Koenig et al.

(10) Patent No.: US 10,190,065 B2
(45) Date of Patent: Jan. 29, 2019

(54) FEED DELIVERY SYSTEM AND METHOD FOR GASIFIER

(71) Applicants: Mark E. Koenig, Pickerington, OH (US); Larry E. Koenig, Canal Winchester, OH (US)

(72) Inventors: Mark E. Koenig, Pickerington, OH (US); Larry E. Koenig, Canal Winchester, OH (US)

(*) Notice: Subject to any disclaimer, the term of this patent is extended or adjusted under 35 U.S.C. 154(b) by 507 days.

(21) Appl. No.: 14/215,920

(22) Filed: Mar. 17, 2014

(65) Prior Publication Data

US 2014/0339346 A1 Nov. 20, 2014

Related U.S. Application Data

(63) Continuation-in-part of application No. 14/046,721, filed on Oct. 4, 2013, and a continuation-in-part of application No. 14/046,736, filed on Oct. 4, 2013, and a continuation-in-part of application No. 14/046,743, filed on Oct. 4, 2013, and a continuation-in-part of application No. 14/046,753, filed on Oct. 4, 2013, now Pat. No. 9,278,814.

(60) Provisional application No. 61/798,870, filed on Mar. 15, 2013.

(51) Int. Cl.
| | |
|---|---|
| *B65G 37/00* | (2006.01) |
| *B02C 21/00* | (2006.01) |
| *B02C 23/02* | (2006.01) |
| *C10J 3/30* | (2006.01) |
| *C10J 3/50* | (2006.01) |
| *B65G 33/22* | (2006.01) |

(52) U.S. Cl.
CPC .............. *C10J 3/30* (2013.01); *B02C 21/00* (2013.01); *B02C 23/02* (2013.01); *B65G 37/00* (2013.01); *C10J 3/50* (2013.01); *B65G 33/22* (2013.01); *C10J 2200/15* (2013.01); *C10J 2200/158* (2013.01); *C10J 2300/093* (2013.01); *C10J 2300/0946* (2013.01)

(58) Field of Classification Search
CPC ....... C10J 3/30; C10J 2200/158; B65G 53/48; B65G 37/00
See application file for complete search history.

(56) References Cited

U.S. PATENT DOCUMENTS

| | | | |
|---|---|---|---|
| 2,831,587 A * | 4/1958 | Rearick .................. | B65G 53/48 198/525 |
| 3,552,423 A | 1/1971 | Vietorisz | |
| 3,654,854 A | 4/1972 | Cook et al. | |
| 3,691,019 A | 9/1972 | Brimhall | |

(Continued)

FOREIGN PATENT DOCUMENTS

| | | |
|---|---|---|
| CN | 202040828 U | 11/2011 |
| CN | 202849347 U | 4/2013 |

(Continued)

*Primary Examiner* — Imran Akram
(74) *Attorney, Agent, or Firm* — Standley Law Group LLP

(57) ABSTRACT

A system for processing material for a gasifier. The system comprises an auger feeder adapted to receive material to be gasified. The auger feeder is adapted to feed the material. In an exemplary embodiment, a tube is connected to the auger feeder such that the tube is adapted to receive the material from the auger feeder. In such an embodiment, the tube is also connected to a gasifier, which is adapted to receive the material from the tube.

17 Claims, 23 Drawing Sheets

(56) References Cited

U.S. PATENT DOCUMENTS

| | | | | |
|---|---|---|---|---|
| 3,709,411 | A | 1/1973 | Shapland | |
| 4,043,471 | A | 8/1977 | Trumball et al. | |
| 4,044,904 | A | 8/1977 | Trumbull et al. | |
| 4,070,161 | A | 1/1978 | Harter | |
| 4,214,859 | A | 7/1980 | Anders | |
| 4,280,415 | A | 7/1981 | Wirguin | |
| 4,325,787 | A * | 4/1982 | Strumskis | C10B 1/04 201/33 |
| 4,337,789 | A | 7/1982 | Lonardo | |
| 4,448,588 | A * | 5/1984 | Cheng | C10J 3/06 48/111 |
| 4,449,671 | A | 5/1984 | Martinez-Vera et al. | |
| 4,483,370 | A | 11/1984 | Talasz | |
| 4,535,801 | A | 8/1985 | Neale | |
| 4,570,550 | A | 2/1986 | Wilt | |
| 4,585,543 | A | 4/1986 | Duncan et al. | |
| 4,688,597 | A | 8/1987 | Clarkson et al. | |
| 4,817,518 | A | 4/1989 | Wyatt et al. | |
| 4,848,249 | A * | 7/1989 | LePori | F23C 6/04 110/229 |
| 4,881,862 | A | 11/1989 | Dick | |
| 4,915,308 | A | 4/1990 | Koenig | |
| 4,968,325 | A * | 11/1990 | Black | C10J 3/482 422/143 |
| 4,978,369 | A | 12/1990 | Pontow et al. | |
| 5,022,328 | A | 6/1991 | Robertson | |
| 5,108,040 | A | 4/1992 | Koenig | |
| 5,205,379 | A | 4/1993 | Pfleger | |
| 5,232,170 | A | 8/1993 | Yang | |
| 5,271,426 | A | 12/1993 | Clarkson et al. | |
| 5,466,108 | A | 11/1995 | Piroska | |
| 5,529,644 | A | 6/1996 | Parayil | |
| 5,580,241 | A | 12/1996 | Koeberle | |
| 5,692,382 | A | 12/1997 | Davison | |
| 5,871,619 | A * | 2/1999 | Finley | C10B 33/02 198/545 |
| 5,919,497 | A | 7/1999 | Kofahl | |
| 5,996,770 | A | 12/1999 | Kjellqvist | |
| 6,050,204 | A | 4/2000 | Stevers et al. | |
| 6,126,907 | A * | 10/2000 | Wada | C10B 7/10 110/246 |
| 6,149,773 | A | 11/2000 | Grimshaw et al. | |
| 6,226,889 | B1 | 5/2001 | Aulbaugh et al. | |
| 6,247,662 | B1 | 6/2001 | Hamilton | |
| 6,269,286 | B1 | 7/2001 | Tse et al. | |
| 6,398,921 | B1 * | 6/2002 | Moraski | C02F 1/302 110/346 |
| 6,752,337 | B2 | 6/2004 | Koenig | |
| 6,761,864 | B2 | 7/2004 | Jasra et al. | |
| 6,972,114 | B2 | 12/2005 | Pope et al. | |
| 6,994,016 | B1 | 2/2006 | Bunker et al. | |
| 7,926,750 | B2 | 4/2011 | Hauserman | |
| 7,964,004 | B2 | 6/2011 | Koch et al. | |
| 8,100,066 | B2 | 1/2012 | Stein | |
| 8,151,716 | B2 | 4/2012 | Harned et al. | |
| 8,317,886 | B2 | 11/2012 | Graham et al. | |
| 8,381,900 | B1 | 2/2013 | Hoogestraat | |
| 2002/0112403 | A1 * | 8/2002 | Pope | C10J 3/482 48/127.3 |
| 2004/0107638 | A1 * | 6/2004 | Graham | C10J 3/30 48/197 FM |
| 2005/0000581 | A1 | 1/2005 | Lane et al. | |
| 2006/0089516 | A1 | 4/2006 | Giercke | |
| 2007/0137537 | A1 * | 6/2007 | Drisdelle | F23B 5/04 110/297 |
| 2008/0018065 | A1 | 1/2008 | Hirao et al. | |
| 2008/0134948 | A1 | 6/2008 | Vera | |
| 2008/0282944 | A1 * | 11/2008 | Tuzson | F23G 7/105 110/259 |
| 2008/0299021 | A1 | 12/2008 | Boykin et al. | |
| 2009/0019771 | A1 | 1/2009 | Pearson | |
| 2009/0022570 | A1 | 1/2009 | Craig et al. | |
| 2009/0126276 | A1 | 5/2009 | Johnson et al. | |
| 2009/0173005 | A1 | 7/2009 | Neumann | |
| 2009/0260823 | A1 | 10/2009 | Prince-Wright et al. | |
| 2010/0040527 | A1 | 2/2010 | Randhava et al. | |
| 2010/0051875 | A1 | 3/2010 | Chornet et al. | |
| 2010/0223839 | A1 * | 9/2010 | Garcia-Perez | C01B 3/34 44/313 |
| 2011/0033268 | A1 | 2/2011 | Craig et al. | |
| 2011/0072723 | A1 | 3/2011 | Liu et al. | |
| 2011/0100388 | A1 | 5/2011 | Li et al. | |
| 2011/0114144 | A1 | 5/2011 | Green et al. | |
| 2011/0162275 | A1 | 7/2011 | Hladun et al. | |
| 2011/0173887 | A1 * | 7/2011 | Tyer, Sr. | C10J 3/007 48/197 R |
| 2011/0232191 | A1 | 9/2011 | Diebold et al. | |
| 2011/0271649 | A1 | 11/2011 | Tetzlaff | |
| 2012/0063965 | A1 | 3/2012 | Coates et al. | |
| 2012/0066974 | A1 | 3/2012 | Jorgenson et al. | |
| 2012/0128560 | A1 | 5/2012 | Krishnamurthy et al. | |
| 2012/0160417 | A1 | 6/2012 | Lee | |
| 2012/0182827 | A1 | 7/2012 | Bairamijamal | |
| 2012/0199795 | A1 | 8/2012 | Gorodetsky et al. | |
| 2012/0258021 | A1 * | 10/2012 | Badger | B01J 8/02 422/203 |
| 2012/0267459 | A1 | 10/2012 | Beirakh et al. | |
| 2013/0192543 | A1 | 8/2013 | Hinterecker | |

FOREIGN PATENT DOCUMENTS

| | | |
|---|---|---|
| DE | 19853717 A1 | 5/2000 |
| DE | 102006050603 A1 | 4/2008 |
| DE | 202006016442 U1 | 4/2008 |
| DE | 102008012156 A1 | 9/2009 |
| EP | 0256186 A1 | 2/1988 |
| EP | 0294627 A2 | 5/1988 |
| EP | 1288278 A1 | 3/2003 |
| EP | 1498678 A1 | 1/2005 |
| GB | 1057977 | 12/1964 |
| GB | 2029355 A | 3/1980 |
| JP | 7158767 A | 6/1995 |
| JP | 200784758 | 4/2007 |
| WO | 9310893 A1 | 6/1993 |
| WO | 9425148 A1 | 11/1994 |
| WO | 9513493 A1 | 5/1995 |
| WO | 2004039923 A1 | 5/2004 |

\* cited by examiner

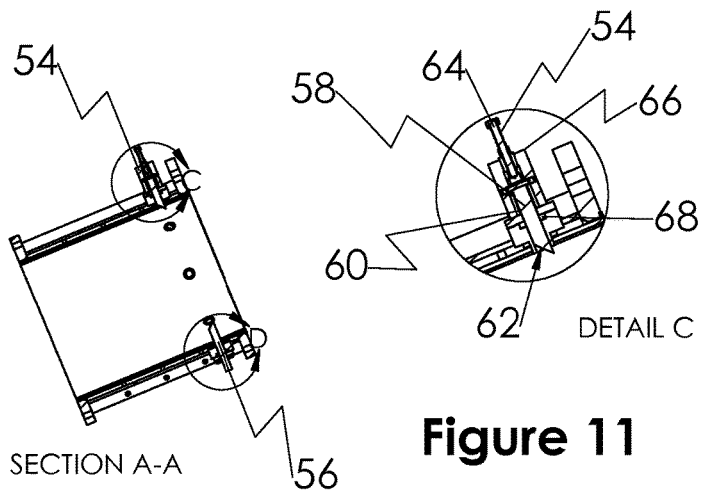
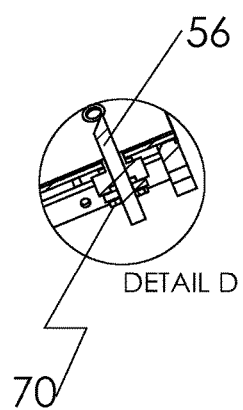
DETAIL C
Figure 11
DETAIL D
Figure 12
Figure 9
SECTION A-A
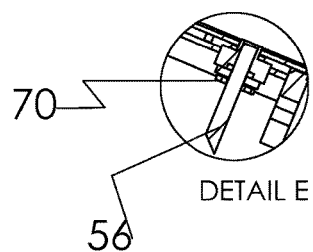
DETAIL E
Figure 13
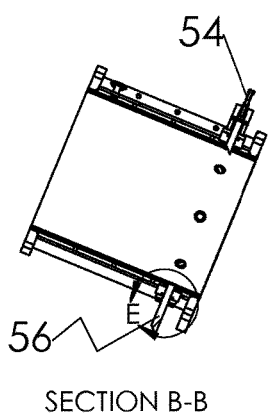
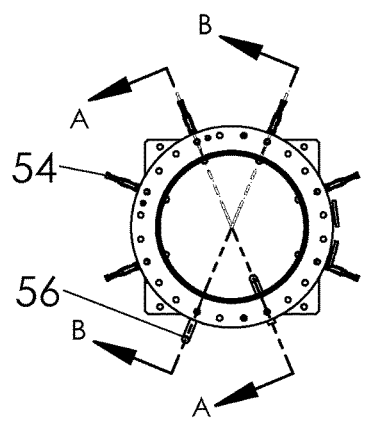
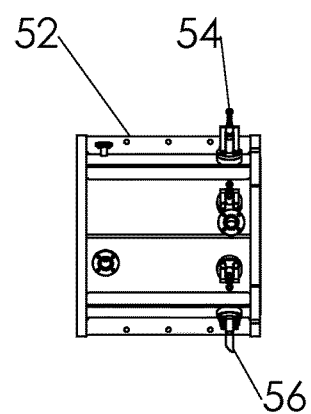
SECTION B-B
Figure 10
Figure 8
Figure 7

Figure 19
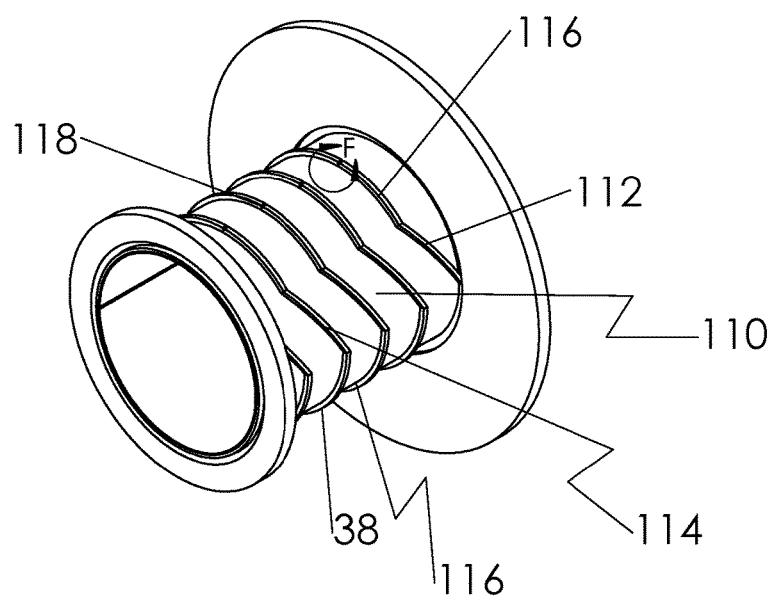
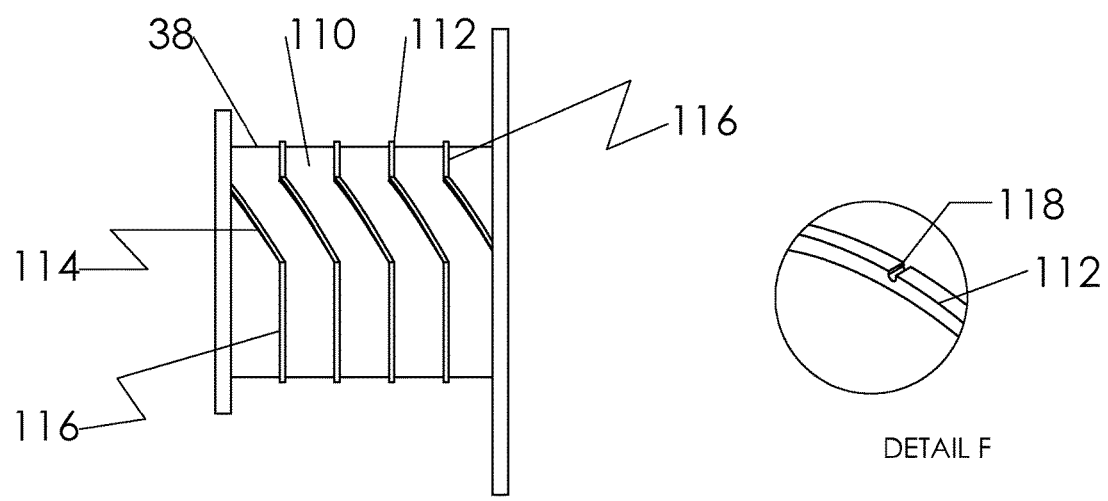
Figure 18
Figure 20
DETAIL F

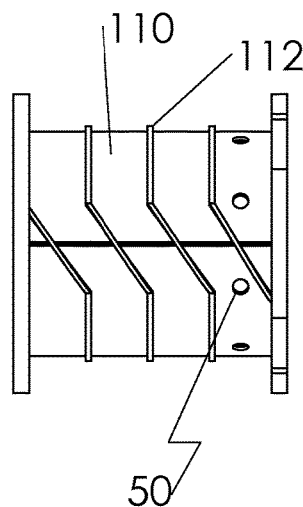
Figure 21
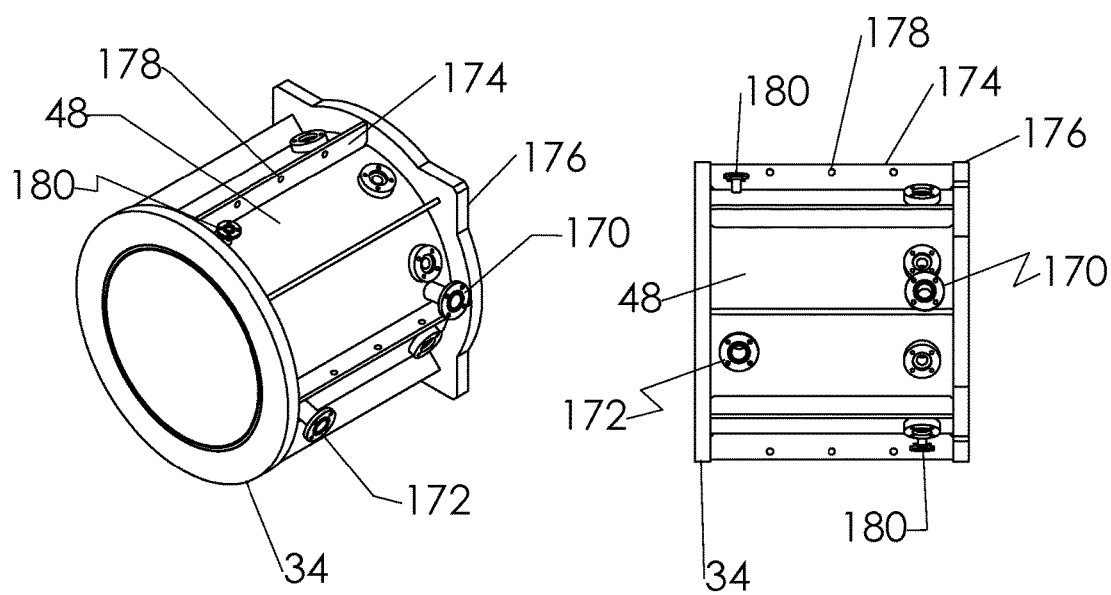
Figure 25          Figure 26

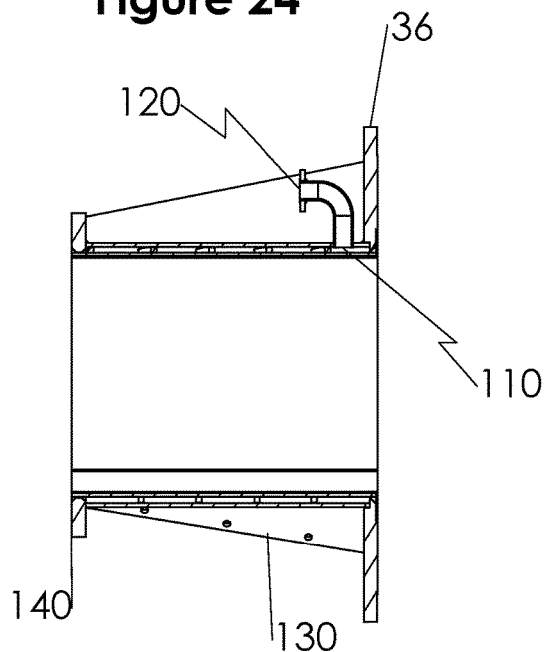
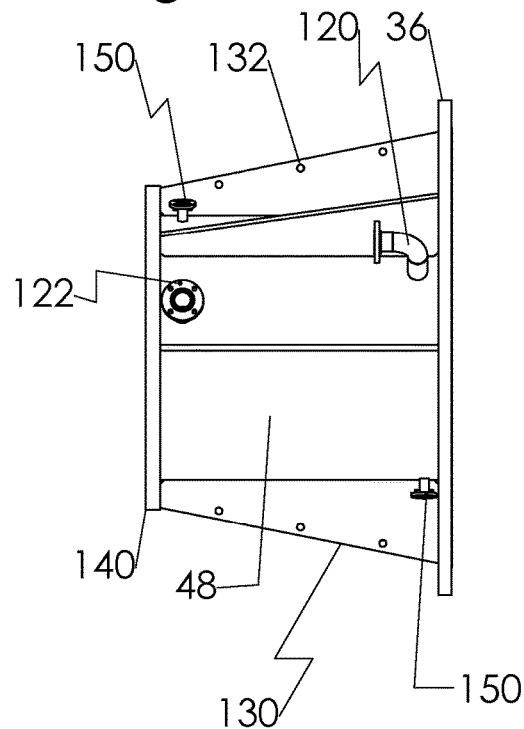
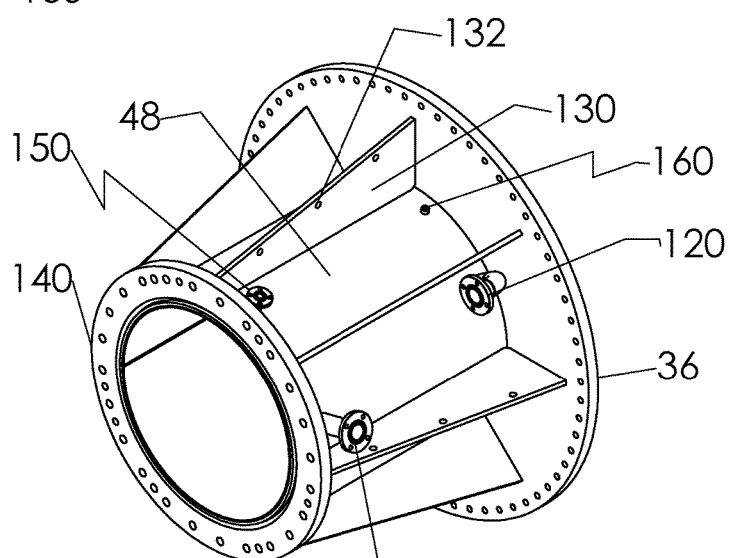

SECTION G-G

DETAIL H

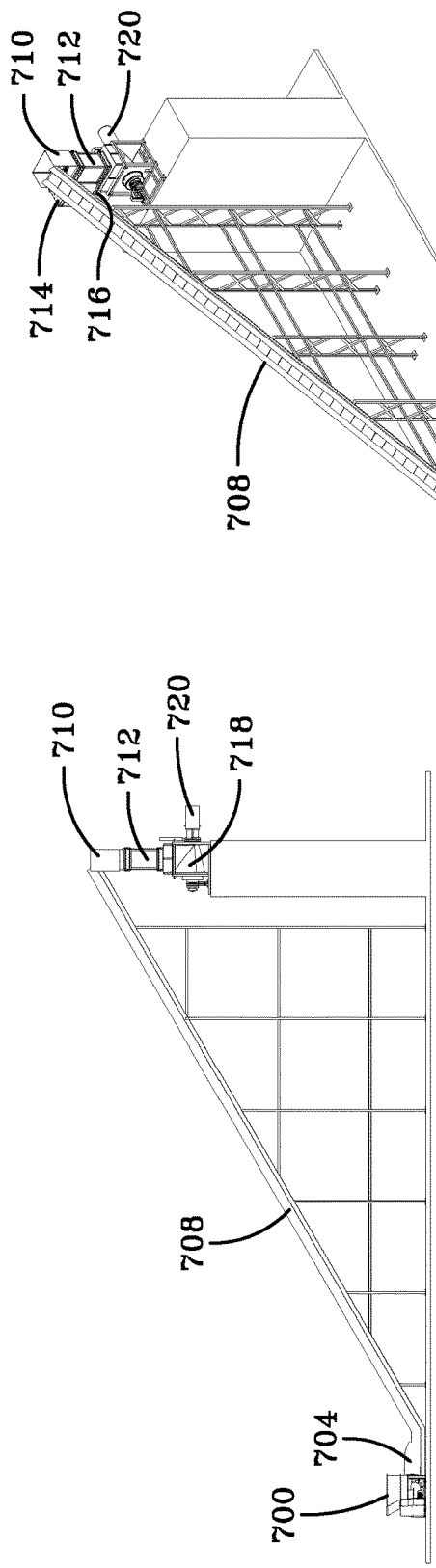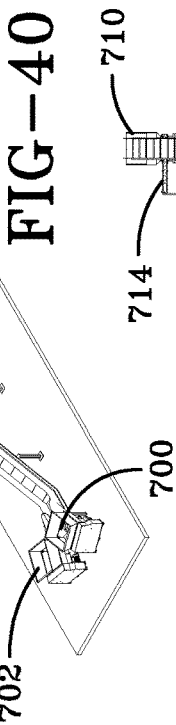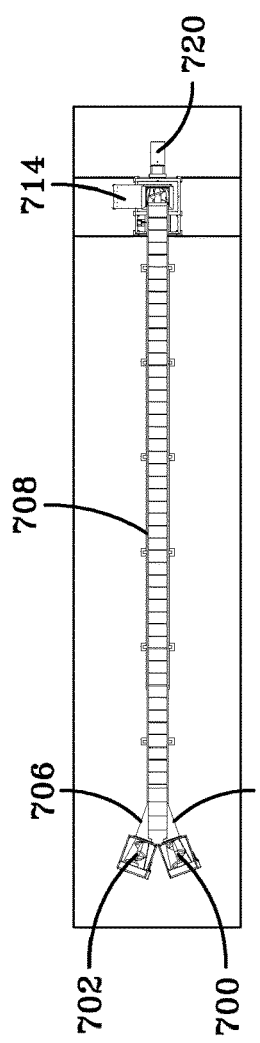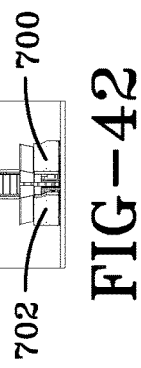

FEED DELIVERY SYSTEM AND METHOD FOR GASIFIER

This application is a continuation-in-part of U.S. patent application Ser. No. 14/046,721, filed Oct. 4, 2013; U.S. patent application Ser. No. 14/046,736, filed Oct. 4, 2013; U.S. patent application Ser. No. 14/046,743, filed Oct. 4, 2013; and U.S. patent application Ser. No. 14/046,753, filed Oct. 4, 2013, each of which claim the benefit of U.S. Provisional Application No. 61/798,870, filed Mar. 15, 2013, which are all hereby incorporated by reference in their entirety.

BACKGROUND AND SUMMARY OF THE INVENTION

Exemplary embodiments of the present invention relate generally to system and methods for providing material to a gasifier. Exemplary embodiments also relate to an outlet tube for an extrusion system. Embodiments of the outlet tube may, for example, be used to deliver material to a gasifier or may be used for other non-gasifier purposes. Further embodiments relate to an isolation gate that may be used in a material delivery system or may have other purposes.

A gasifier is a system that uses intense heat, substantially without combustion, to convert a solid material to gases. One example of a gasifier is a plasma furnace that uses a high-temperature arc to facilitate the conversion. Other examples of gasifiers include: counter-current fixed bed, co-current fixed bed, fluidized bed, entrained flow, and free radical. It is not intended to limit the invention to any particular type of gasifier unless expressly set forth otherwise.

Gasification is becoming increasingly more in demand. The process may be an effective means to dispose of waste materials including, but not limited to, municipal solid waste (MSW). Other types of feedstock may also be used in a gasifier such as organic materials, fossil-based carbonaceous materials (e.g., coal and petroleum coke), and biomass materials and other waste-derived feedstocks (e.g., wood, plastics, aluminum, refuse-derived fuel (RDF), agricultural and industrial wastes, sewage sludge, switchgrass, various crop residues, and black liquor. Other types of feedstock are possible. Accordingly, it is not intended to limit the invention to use with a particular feedstock unless expressly set forth otherwise.

Gasification may also result in the production of useful products. The produced gases, which commonly include hydrogen, carbon dioxide, and carbon monoxide, may be referred to as syngas (i.e., synthetic gas), and it may be used as a fuel or in the production of other energy sources (e.g., other synthetic fuels). Syngas may also be used to produce synthetic chemicals or other types of energy such as heat, electricity, and power. In addition to syngas, a typical gasification process may also produce some slag material. However, even this slag material may serve beneficial purposes (e.g., reuse in pavement materials).

A drawback, however, exists with respect to the known systems and methods for providing material to the gasifier. Because of the intense heat, care must be taken to contain the heat. Typically, a batch delivery system and method is used to deliver the waste material to the gasifier, which may be comprised of multiple distinct devices to advance the material in batches. With such a system, a mechanical airlock is used to seal the gasifier with each load. However, airflow to the gasifier is only marginally controlled, as there is still free air within the airlock chamber along with feedstock which can cause combustion of the material and can make control difficult. Moreover, known batch delivery systems and methods limit the amount of material that can be delivered to the gasifier. Furthermore, because of the characteristics of the batch feed supply, the material is burned in an uneven and irregular pattern, which can impact the conversion to gas. A need, therefore, exists for an improved system and method for processing material for a gasifier. A need also exists for a system and method adapted to extrude material in a manner that overcomes the disadvantages of batch delivery. In addition, a need exists for a system and method of isolating an area or a flow of material. Furthermore, a need exists for a system and method for creating a substantially airtight seal with a flow of a continuous plug of material to a gasifier. Finally, a need exists for a system and method for more efficiently delivery of material to a gasifier.

Exemplary embodiments of the present invention may satisfy some or all of the aforementioned needs. For instance, one exemplary embodiment may deliver a flow of a feedstock material to a gasifier such that the flow of the feedstock provides a substantially airtight seal to the gasifier. Another exemplary embodiment provides a tube for an extrusion system that is adapted to allow a desired flow of material through the tube. In one example of the tube, it may be adapted to provide material to a gasifier, but other examples may have other uses. Another embodiment is directed to a system and method for providing material to a gasifier with at least one auger and/or at least one conveyor. Yet another embodiment relates to an isolation gate such as for isolating an area or a flow of material. Still other embodiments may combine some or all of the features of the aforementioned embodiments. As such, exemplary embodiments may overcome some or all of the previously described disadvantages of the known art. Nevertheless, it should also be recognized that some of these exemplary embodiments may have utility in other areas unrelated to gasification.

In addition to the novel features and advantages mentioned above, other benefits will be readily apparent from the following descriptions of the drawings and exemplary embodiments.

BRIEF DESCRIPTION OF THE DRAWINGS

FIG. 7 is a side elevation view of an exemplary embodiment of a proximal section of an outlet tube.

FIG. 8 is an end elevation view of the proximal section of the outlet tube of FIG. 7.

FIG. 9 is a cross-sectional view along line A-A of FIG. 8.

FIG. 10 is a cross-sectional view along line B-B of FIG. 8.

FIG. 11 is a detailed view of section C of FIG. 9 showing an example of an adjustable restrictor.

FIG. 12 is a detailed view of section D of FIG. 9 showing an example of a fixed restrictor.

FIG. 13 is a detailed view of section E of FIG. 10 showing an example of a fixed restrictor in a flush position.

FIG. 18 is a side elevation view of an exemplary embodiment of a distal section of the inner wall of the outlet tube of FIG. 5.

FIG. 19 is a perspective view of the distal section of the inner wall of FIG. 18.

FIG. 20 is a detailed view of an exemplary embodiment of a notch in a ridge on the inner wall of FIG. 19.

FIG. 21 is a side elevation view of an exemplary embodiment of a proximal section of the inner wall of the outlet tube of FIG. 5.

FIG. 22 is a perspective view of an exemplary embodiment of a distal section of the outlet tube of FIG. 5.

FIG. 23 is a side elevation view of the distal section of FIG. 22 (with a stiffener not shown for clarity).

FIG. 24 is a cross-sectional view of the distal section of FIG. 22.

FIG. 25 is a perspective view of an exemplary embodiment of a proximal section of the outlet tube of FIG. 5 (with restrictors not shown for clarity).

FIG. 26 is a side elevation view of the proximal section of FIG. 25 (with restrictors not shown for clarity).

FIG. 39 is a side elevation view of an exemplary embodiment of a system for delivering material to a gasifier.

FIG. 40 is a perspective view of the system of FIG. 39.

FIG. 41 is a top plan view of the system of FIG. 39.

FIG. 42 is an end elevation view of the system of FIG. 39.

DETAILED DESCRIPTION OF EXEMPLARY EMBODIMENT(S)

Exemplary embodiments of the present invention relate to systems, apparatuses, and methods for extruding material. Exemplary embodiments may have particular benefits for processing material for a gasifier. However, some exemplary embodiments may also have applications unrelated to gasification or the extrusion of material.

Figure 1:
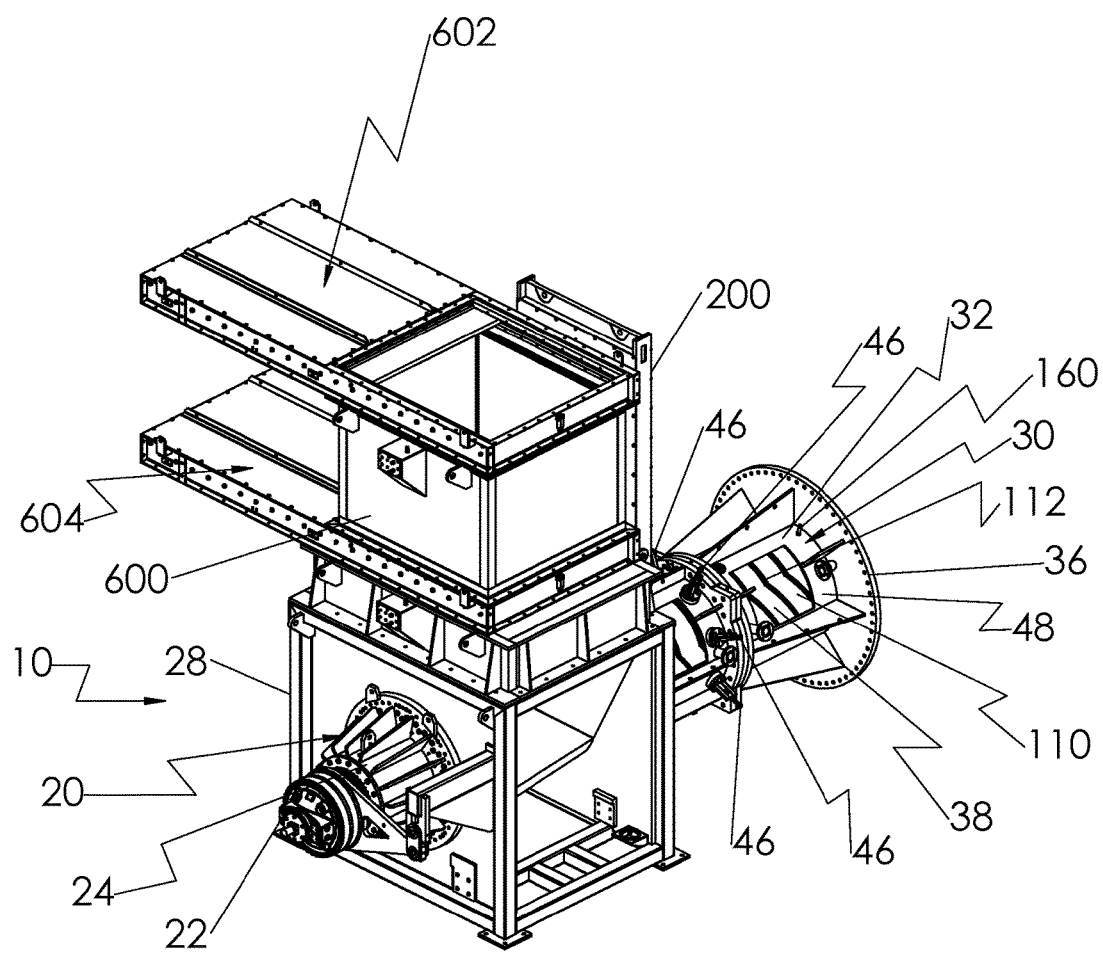
FIG. 1 is a perspective view of an exemplary embodiment of a system for extruding material (with portions not shown for clarity).
Figure 2:
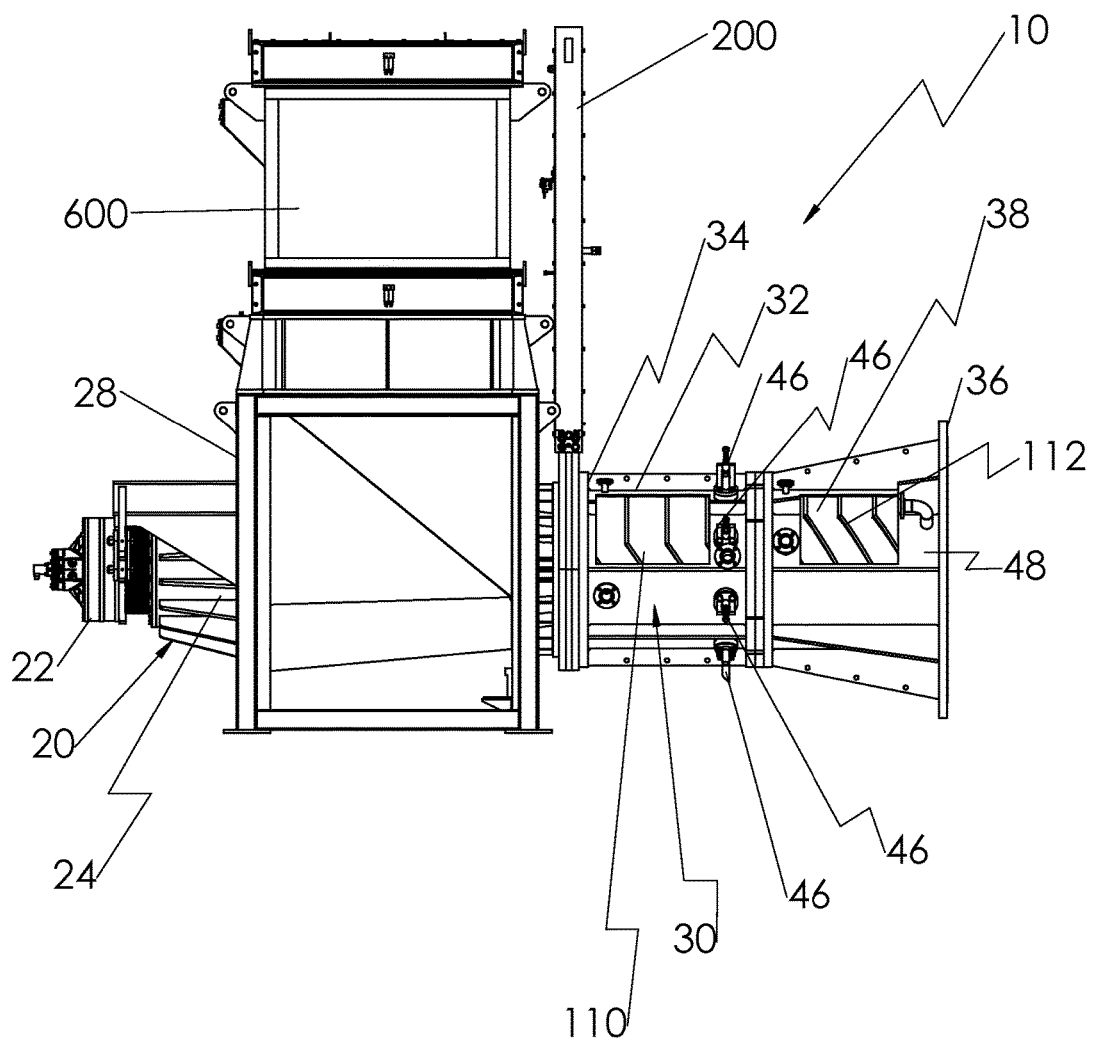
FIG. 2 is a side elevation view of the system of FIG. 1 (with portions not shown for clarity).
Figure 3:
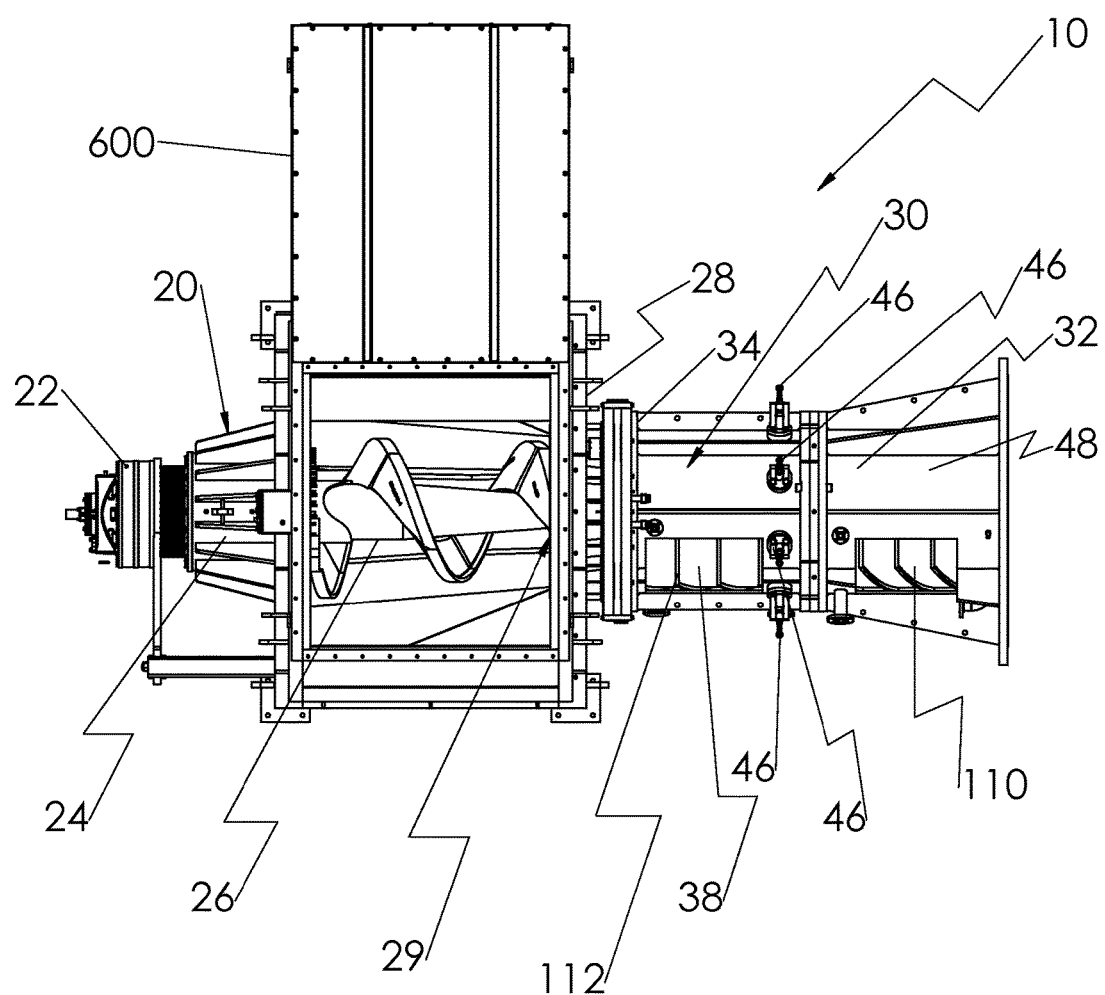
FIG. 3 is another side elevation view of the system of FIG. 1 (with portions not shown for clarity).

FIGS. 1-3 show various views of an exemplary embodiment of a system 10 for extruding material. As stated above, this embodiment is particularly useful for extruding material to a gasifier, but may also have other uses unrelated to gasification. This embodiment is comprised of an auger feeder 20 that is in association with an outlet tube 30. In particular, auger feeder 20, which may also be referred to as a screw feeder or auger, is adapted to receive material and advance it through the outlet tube 30. In such a manner, an exemplary embodiment of system 10 is adapted to move a substantially continuous flow of feedstock material from auger feeder 20 and through the outlet tube 30 to a desired location (e.g., a gasifier).

In this exemplary embodiment, auger feeder 20 is powered by a motor 22 that is associated with a drive 24. An example of motor 22 is an electric motor that is adjustable or variable speed (VFD). As a result, the speed of the auger feeder 20 may be adjusted to suit to the particular feedstock being fed to it. However, in other exemplary embodiments, other types of motors may be used that are able to suitably rotate auger screw 26 of auger feeder 20, including motors that are not electric or variable speed.

Figure 4:
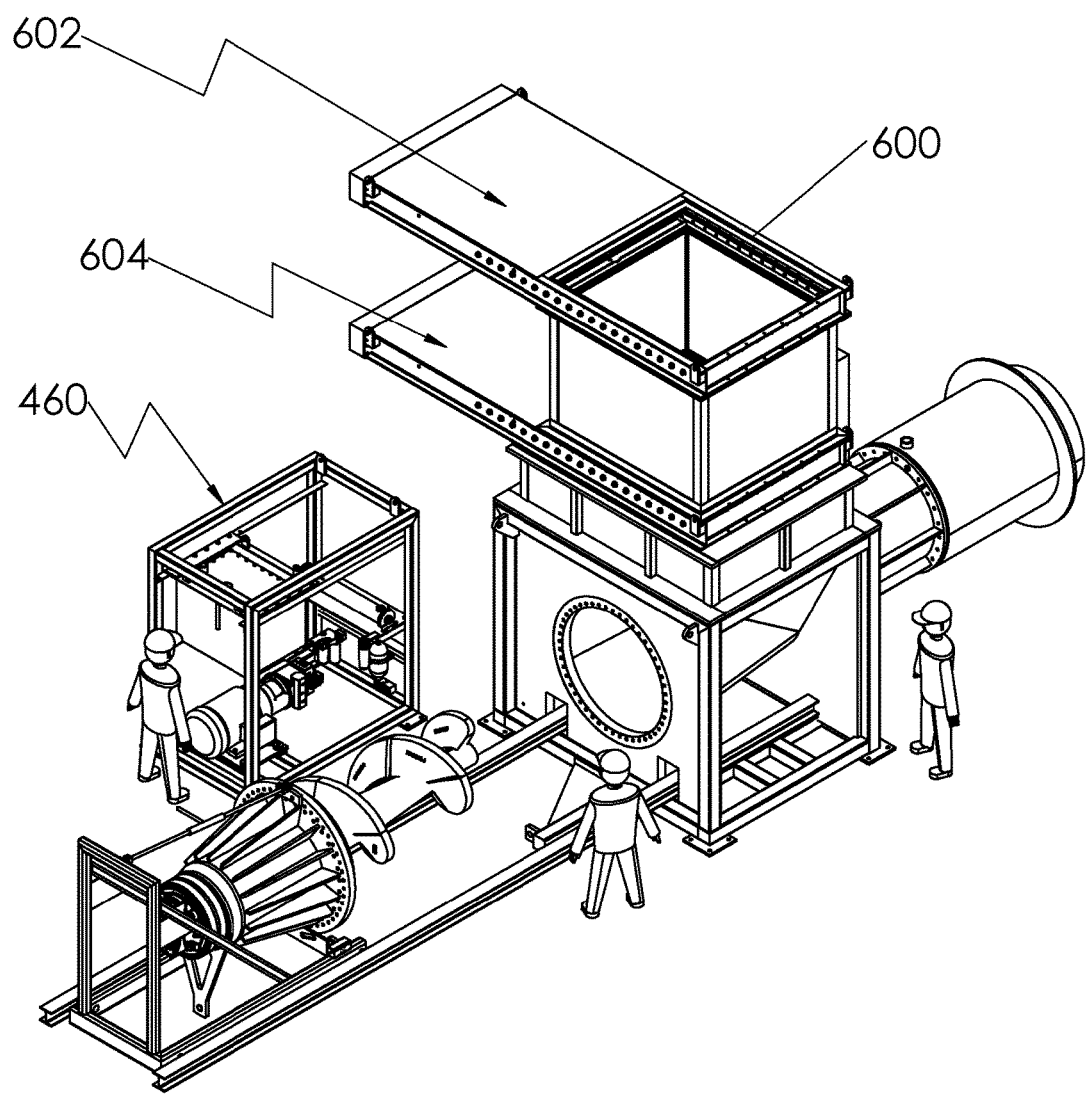
FIG. 4 is a perspective view of another exemplary embodiment of a system for extruding material.

As can be seen in FIG. 3, auger feeder 20 may comprise a processing chamber 28 through which screw 26 extends. In an exemplary embodiment, screw 26 may be withdrawn from processing chamber 28 such as for maintenance. FIG. 4 shows one example of a screw that is in a withdrawn position. In this example, the screw is slidably mounted on a track to facilitate insertion and withdrawal of the screw relative to the processing chamber.

In operation, feedstock is fed into processing chamber 28. In an exemplary embodiment, screw 26 may then densify the material as it force feeds it through opening 29 of processing chamber 28 and into outlet tube 30. As screw 26 forces a flow of material through outlet tube 30, the material may be further densified in an exemplary embodiment. As a result, the flow of material may be adapted to provide a substantially airtight plug in outlet tube 30. More particularly, as the flow of material moves through outlet tube 30 in an exemplary embodiment, it may provide a substantially airtight seal to any device or system adapted to receive the flow of material from the outlet tube 30 (e.g., a gasifier). At the same time, outlet tube 30 is adapted to substantially eliminate free air that is trapped in the feedstock material as it densifies it. In one example, material such sorted MSW may be densified up to about six times, thus eliminating free air in the feedstock material. As a result, in addition to providing a substantially air tight seal, outlet tube 30 may substantially eliminate free air in the feedstock material that is provided to a gasifier in an exemplary embodiment, thereby vastly improving the efficiency of the gasifier.

Outlet tube 30 may be connected to processing chamber 28 such as shown in FIGS. 2 and 3. In this example, outlet tube 30 is comprised of a body 32 that is adapted to be connected to auger feeder 20. In particular, this embodiment of body 32 includes a proximal flange 34 that facilitates a connection to auger feeder 20. This embodiment of body 32 also includes a distal flange 36 that facilitates a connection to a device or system that is adapted to receive the feedstock material from outlet tube 30 (e.g., a gasifier). Other embodiments may be connected in any other suitable manner to an auger feeder or to a device or system that is adapted to receive material from the outlet tube. Also, in some other exemplary embodiments, an outlet tube may otherwise be associated with an auger feeder in another manner suitably adapted to receive the material from the auger.

Figure 5:
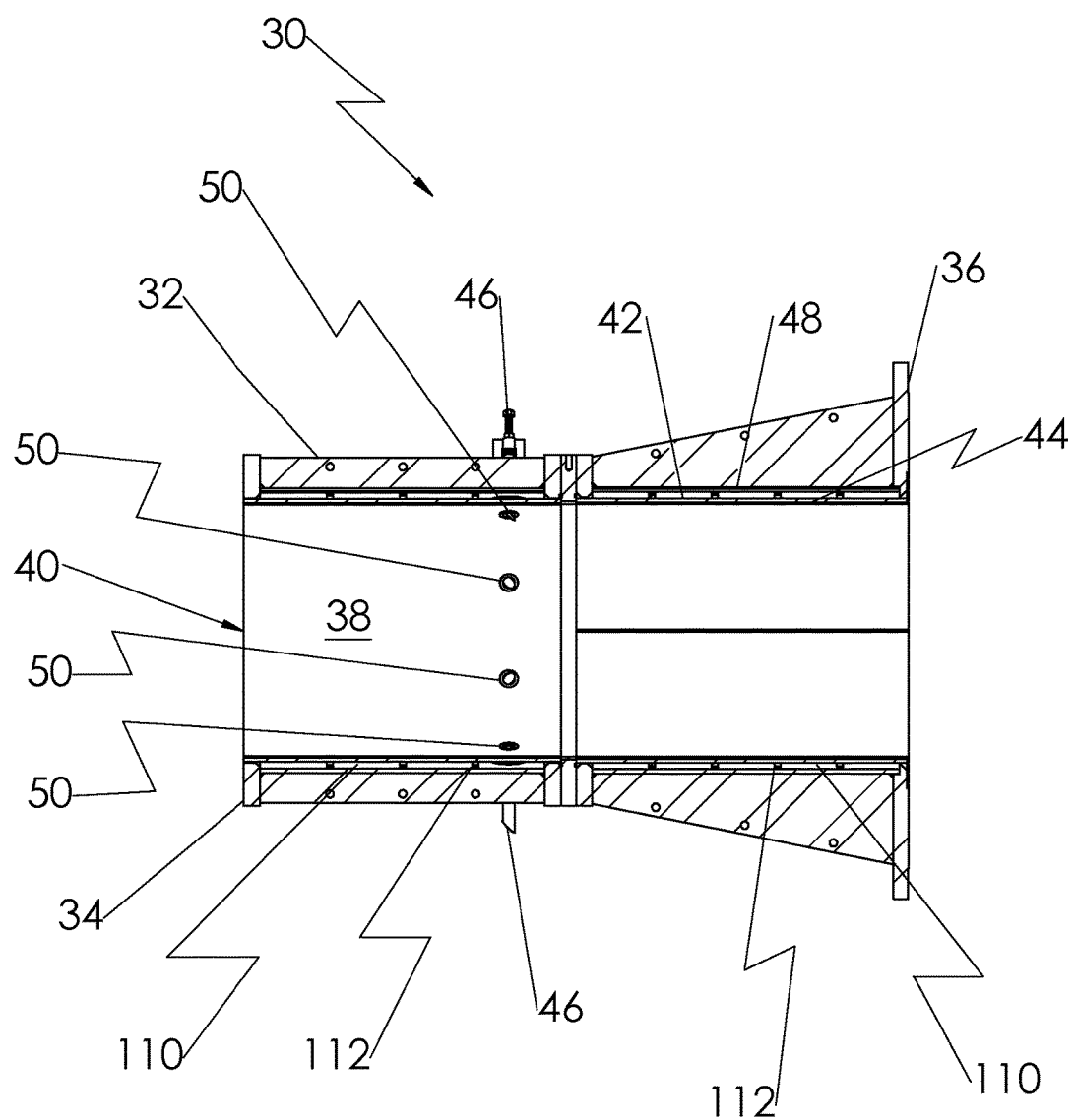
FIG. 5 is a cross-sectional view of the outlet tube of FIG. 1.
Figure 6:
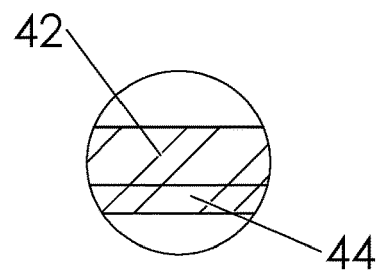
FIG. 6 is a detailed, cross-sectional view of an inner wall of the outlet tube of FIG. 5.

FIG. 5 shows a cross-sectional view of outlet tube 30. Such as can be seen in this figure, body 32 has an inner wall 38 that defines an opening 40 adapted to receive material from auger feeder 20. The opening 40 is adapted to allow a flow of material through the body and out of tube 30 to a desired application (e.g., a gasifier). A detailed view of inner wall 38 is shown in FIG. 6. In this exemplary embodiment, inner wall 38 is comprised of an outer layer 42 of carbon steel and an inner layer 44 of stainless steel, which may be explosion bonded together. Stainless steel may provide enhanced resistance to wear, whereas carbon steel may promote ease of manufacturing. Despite the benefits of the two-layer fabrication, other embodiments of an inner wall may be comprised of only one type of steel or may be comprised of one or more other suitable materials.

Outlet tube 30 may also comprise at least one restrictor 46 adapted to facilitate densification of the feedstock material. More particularly, each restrictor 46 is adapted to extend inwardly from the inner wall 38 of body 32 into opening 40. For example, restrictors 46 are configured to extend inwardly at least about 4 inches from inner wall 38 into opening 40 in this embodiment. However, in other embodiments, a restrictor may extend or be adapted to extend inwardly any suitable distance from the inner wall in order to impede the flow of material. In this embodiment, each restrictor extends through inner wall 38 and also outer wall 48 of body 32. FIG. 5 shows holes 50 in inner wall 38 through which restrictors 46 are adapted to respectively extend. However, in FIG. 5, the restrictors 46 are shown in a withdrawn position such that they are approximately flush with inner wall 38. In some other embodiments, a restrictor may simply extend from the inner wall without protruding through it. In either event, a restrictor may be adjustable or fixed in position. In FIG. 5, the restrictors are adjustable such that they may extend further into opening 40 to impede the flow of material. In this example, the restrictors are independently adjustable. Each restrictor may be adjusted to extend a desired distance from inner wall 38. For example, restrictors may be independently withdrawn (e.g., flush with the inner wall), extended, or any combination thereof to achieve a desired flow of feedstock material. However, in some other embodiments, the restrictors may be adjusted together, in unison, or according to a preset pattern or formation. For example, all of the restrictors may be adjusted to extend the same distance from the inner wall, or each restrictor may be adjusted such as in a programmed pattern.

In this example, at least one restrictor 46 extends from a proximal portion or section of outlet tube 30. In other embodiments, a restrictor may extend from a distal portion or section of an outlet tube. In fact, some embodiments may have at least one restrictor in both of a proximal portion and a distal portion of an outlet tube.

FIG. 5 shows an example of opening 40 that has a cylindrical shape. In particular, the cylindrical shape is substantially the same before and after restrictors 46. In other words, opening 40 returns to the cylindrical shape after restrictors 46. In such embodiments, opening 40 has a substantially same cross-sectional shape in a proximal section and in a distal section of the outlet tube. Moreover, with the exception of restrictors 46, opening 40 has substantially uniform dimensions throughout a length of the body. Such characteristics promote a smooth flow of material. In an exemplary embodiment, this promotes optional conversion of the material to gas in a gasifier. Other embodiments of an opening, however, may have a non-cylindrical shape (e.g., polygonal) or a shape that is not consistent throughout (e.g., different shapes in the proximal and distal portions).

FIGS. 7-12 show various views of an exemplary embodiment of a proximal portion 52 of an outlet tube, which is adapted to receive and densify a feedstock material. This example shows a combination of adjustable restrictors 54 and fixed (i.e., stationary) restrictors 56. Other examples may comprise all of the same type restrictors (i.e., adjustable or fixed). In this exemplary embodiment, the restrictors are positioned radially around the outlet tube as shown in FIG. 8 and are set substantially the same distance apart, which may be used to promote substantially even formation of a continuous plug of feedstock material. In other embodiments, the restrictors may not be positioned radially around a tube or may be positioned different distances apart. For example, this may be the case if the tube has an irregular or non-cylindrical opening through which material flows.

An example of adjustable restrictor 54 is most clearly shown in FIG. 11. In this exemplary embodiment, restrictor 54 comprises a post (i.e., rod) 58 that is adapted to extend inwardly from the inner wall of the body into the opening. As such, post 58 is configured to impede the flow of feedstock material when it is extended, while at the same time enabling the impeded flow to flow around restrictor 54 to exit out of the tube. This configuration further enables the discharged flow of material to break apart after exiting the tube. Such as for these benefits, post 58 comprises a rounded side 60 and a beveled (e.g., chamfered) end 62, which may be substantially aligned with the direction of flow, to encourage the impeded flow to flow around restrictor 54 to exit out of the tube. More particularly, post 58 has a cylindrical shape with a beveled end 62. Other embodiments of an adjustable restrictor may have a different shape that is suitable for impeding the flow of feedstock material. In this example, restrictor 54 further comprises a bolt 64 in association with post 58 such that bolt 64 is adapted to adjust the distance that post 58 extends inwardly from the inner wall of the body into the opening. In particular, bolt 64 is in threaded engagement with a base 66 to allow manual adjustment of the distance. Other embodiments may have different configurations that are suitable for adjusting the distance. In addition, an exemplary embodiment of an adjustable restrictor may be substantially airtight. In this example, restrictor 54 comprises high temperature packing material 68 for a substantially airtight seal. However, some embodiments may not be substantially airtight.

FIGS. 12 and 13 show fixed restrictors 56 set in different positions. In these examples, restrictors 56 may be substantially similar to restrictors 54, with the exception of the adjustability features. In FIG. 12, restrictor 56 is set to extend through the inner wall and into the flow of material, whereas FIG. 13 shows restrictor 56 set to be substantially flush with the inner wall when not in use (e.g., some material flows may not require use of all restrictors). Restrictor 56 may be flipped between these two positions by resetting the position of base 70, but the distance that restrictor 56 extends into the opening of the outlet tube is not otherwise adjustable. Other embodiments of a fixed restrictor may have a different configuration. For example, some embodiments may extend from, but not through, the inner wall of the outlet tube. In another example, a restrictor may not be adapted to be reset to a withdrawn position.

Figure 15:
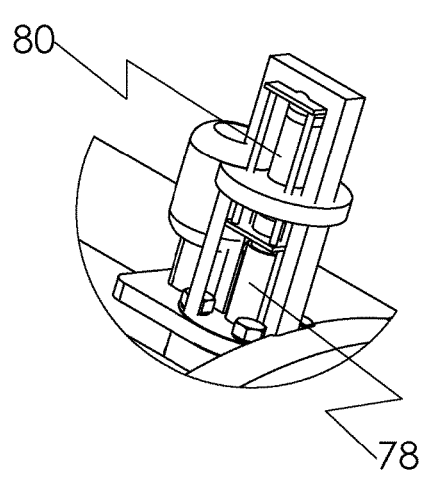
FIG. 15 is a perspective view of an exemplary embodiment comprising a hydraulic system for facilitating adjustment of a restrictor.
Figure 14:
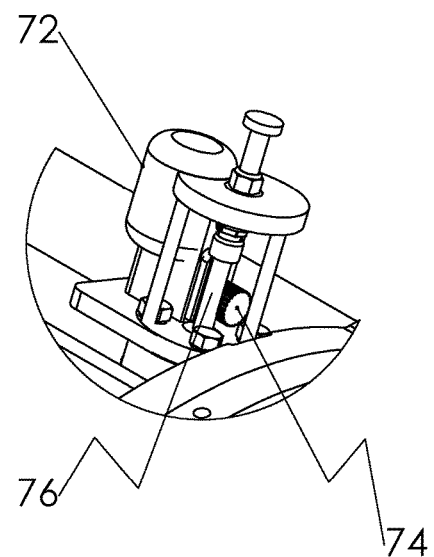
FIG. 14 is a perspective view of an exemplary embodiment comprising a motor for facilitating adjustment of a restrictor.

In other exemplary embodiments, at least one restrictor may be adjusted in a different manner. In addition to manual adjustability, other examples of a restrictor may be adjusted with automated means. FIG. 14 illustrates an example of a motor 72 comprising a drive 74 in engagement with a restrictor 76 for facilitating adjustment. One example of a suitable motor may be electric, but other types of motors may also be utilized. FIGS. 1-3 show an example of the use of at least one restrictor that is adapted to be adjusted by a motor. On the other hand, FIG. 15 shows an example of a restrictor 78 in association with a hydraulic system 80 that is adapted to facilitate adjustability.

Figure 16:
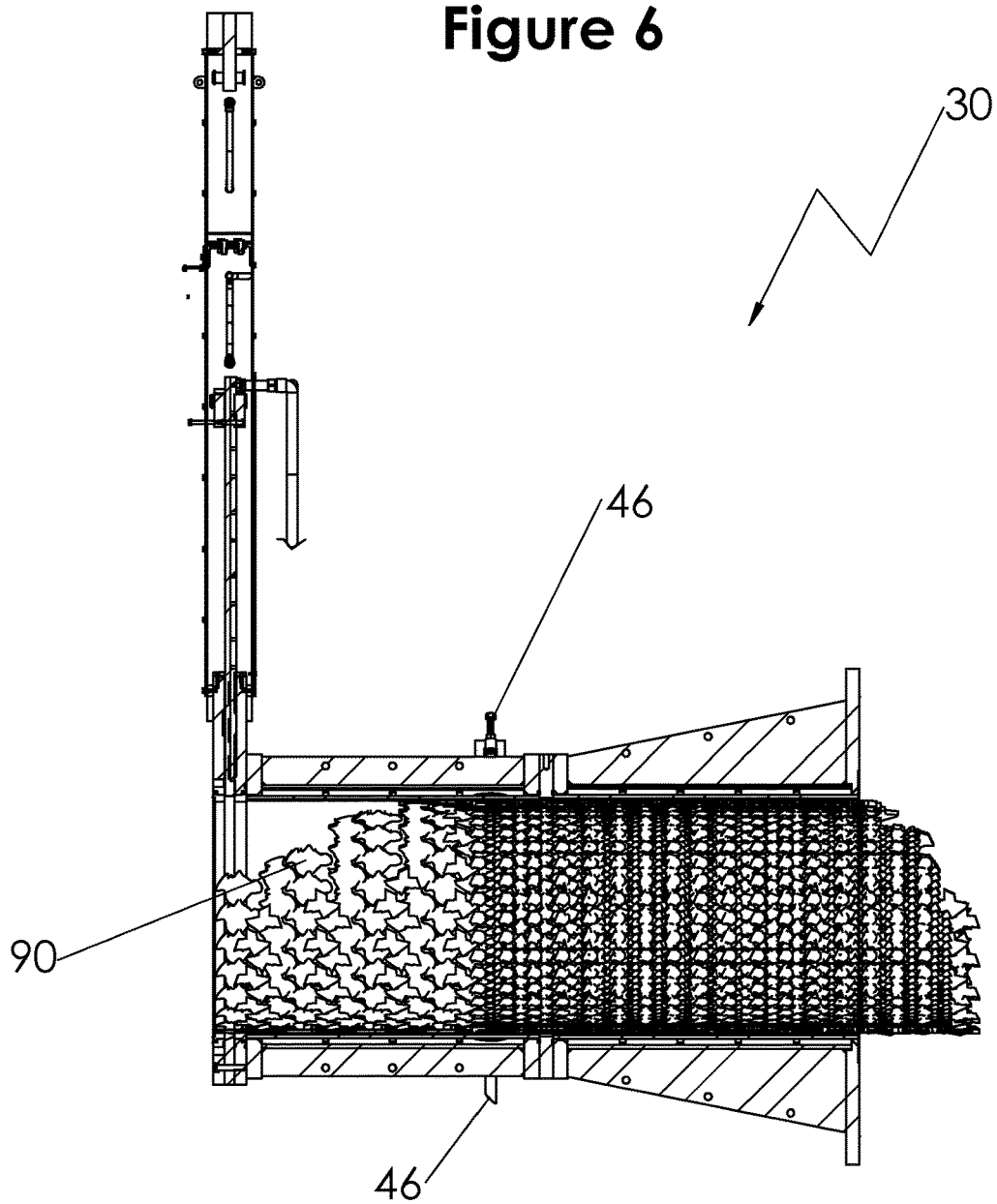
FIG. 16 is a cross-sectional view of an example of feedstock material flowing through the outlet tube of FIG. 5.
Figure 17:
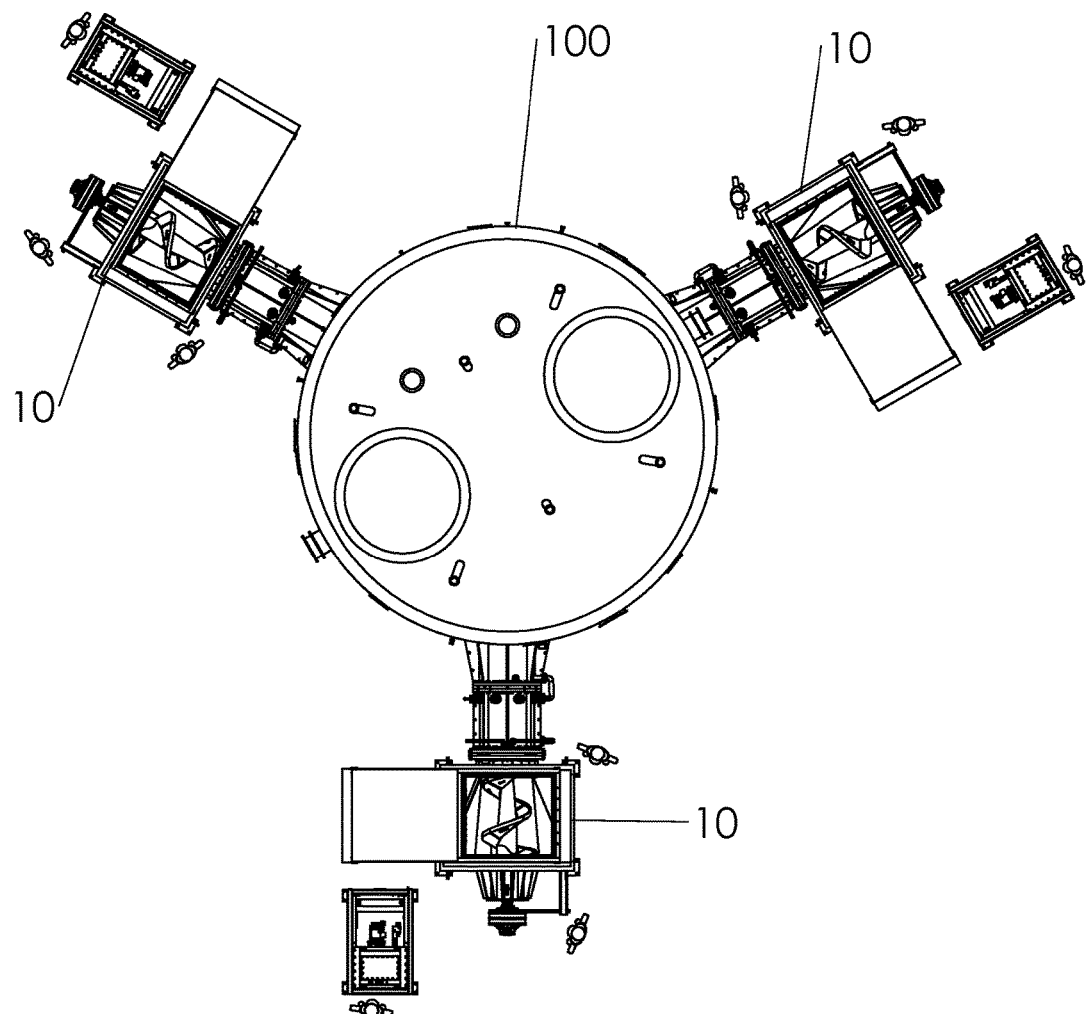
FIG. 17 is a top plan view of one exemplary embodiment of a gasification system comprising multiple feeder systems for delivering feedstock material to a gasifier.

Regardless of whether a restrictor is adjustable or stationary, a restrictor is adapted to extend into a flow of feedstock material to impede the flow. By impeding the flow, an exemplary embodiment is adapted to create a substantially airtight plug of feedstock material as it flows through the outlet tube (e.g., outlet tube 30). FIG. 16 shows an example of a flow of material 90 into a proximal portion of outlet tube 30. In this example, the flow of material is impeded by at least one restrictor 46 that extends into the flow. This causes the material 90 to densify, which creates a continuous plug of material as it continues to flow through outlet tube 30. The plug of material is substantially airtight, which substantially prevents airflow through the tube in an exemplary embodiment. A further benefit of an exemplary embodiment is that the plug of material 90 is still adapted to break apart when it exits the distal end of outlet tube 30 such as shown in FIG. 16. This benefit may be facilitated by the use of restrictors 46 in a proximal portion of outlet tube 30. In a gasification system, for example, this promotes even and efficient conversion of the material to gas. As a result, an exemplary embodiment is adapted to continuously feed and move material through the outlet tube to significantly increase the material processing efficiency of the system. For instance, an example of a batch feed system may process approximately 10 cubic tons of waste material per hour, whereas one exemplary embodiment of the present system may process at least about 25 cubic tons of waste material per hour. In fact, some exemplary embodiments may provide feed rates of 1 cubic ton or lower per hour, or up to about 100 cubic tons per hour. Other examples may be adapted to process material at a different rate (e.g., less or more material per hour). In addition, exemplary embodiments of system 10 may be used in conjunction to further increase the amount of material that may be processed. FIG. 17 shows an example of three embodiments of system 10 connected to a gasifier 100. In this example, each system 10 may process at least about 25 cubic tons of waste material per hour (e.g., 100 cubic tons per hour) to gasifier 100. Thus, in this embodiment, at least about 75 cubic tons of waste material per hour (e.g., 300 cubic tons per hour) may be delivered to gasifier 100. Other examples may be comprised of one or more systems to process the desired amount of material (e.g., two embodiments of system 10 may be adapted to process at least about 50 cubic tons or more of waste material per hour).

An exemplary embodiment of outlet tube 30 may provide further benefits for use in a gasification system. Such as shown in the example of FIG. 16, outlet tube 30 may provide a continuous plug of feedstock material to a gasifier for conversion. Such an embodiment of outlet tube 30 may also allow for a flow of coal or anthracite to a gasifier. In particular, the use of restrictors 46 may allow for the flow of coal or anthracite substantially without crushing it into small particles that are not desirable for use in a gasifier. In other words, the coal or anthracite may maintain suitable size characteristics for use in a gasifier. In fact, in an exemplary embodiment, the feed system and outlet tube may remain the same for the flow of coal/anthracite and the flow of feedstock material, and restrictors 46 may not even have to be adjusted between the flows, which allows for an efficient process.

An exemplary embodiment of a system may also include features to facilitate cooling. FIGS. 1-3 show an example of system 10 that is adapted to cool outlet tube 30. In this example, the ability to cool outlet tube 30 may be particularly beneficial for use in a gasification system such as shown in the example of FIG. 17. However, some exemplary embodiments may not include cooling. Also, some exemplary embodiments that include cooling features may have uses other than in a gasification system.

Outlet tube 30 includes a channel 110 that extends about or around body 32. In the example of FIGS. 1-3, channel 110 extends around body 32 from a distal portion to a proximal portion. Accordingly, water or another suitable cooling fluid may be circulated through channel 110 in order to cool outlet tube 30. Other exemplary embodiments may have a different configuration, may be adapted to circulate cooling fluid in a different direction (e.g., from the proximal portion to the distal portion), or may have one or more channels that do not extend around the body or that do not extend from a distal portion to a proximal portion (or vice versa).

In this exemplary embodiment, channel 110 is formed between inner wall 38 and outer wall 48 of body 32 as shown in FIG. 5. FIGS. 18 and 19 show an example of a distal section of inner wall 38, which is adapted to allow a flow of material to exit the outlet tube. In this exemplary embodiment, inner wall 38 includes a ridge 112 that facilitates the formation of channel 110. Such as shown, ridge 112 may have portions 114 that extend at oblique angles about inner wall 38 to encourage circulation of the cooling fluid in a desired direction. In this exemplary embodiment, ridge 112 may also have substantially perpendicular portions 116 as it extends about the upper and lower portions of inner wall 38. In the embodiment of FIG. 20, ridge 112 may also include at least one notch 118 to encourage drainage of the cooling fluid when not in use. In this example, each portion 116 may include a notch 118 (e.g., at opposing portions of the inner wall 38). Other examples may not include a notch. As shown in FIG. 5, the channel 110 is further defined by outer wall 48 when it is connected to inner wall 38. In other embodiments, a channel or ridge may have a different configuration (e.g., a spiral configuration) or may be formed in another suitable manner (e.g., a groove may be formed in a wall).

In this embodiment, channel 110 continues to the proximal section of outlet tube 30. FIG. 21 shows an example of the proximal section of inner wall 38 of outlet tube 30. Such as shown, the configuration of channel 110 in the proximal section may be substantially similar to the configuration of channel 110 in the distal section. However, in some other exemplary embodiments, the configurations of the proximal and distal sections may be different.

FIGS. 22-24 show various views of an exemplary embodiment of a distal section of outlet tube 30. In this example, a cooling fluid such as water may flow into an inlet port 120 in order to cool outlet tube 30. Inlet port 120 is in fluid communication with channel 110 such as shown in FIG. 24. The cooling fluid may then flow through channel 110 to outlet port 122, which is also in fluid communication with channel 110. From there, the cooling fluid may be discharged or it may flow through a fluid path, which may be external to body 32, to the proximal section of outlet tube 30.

An exemplary embodiment of outlet tube 30 may essentially act as a pressure vessel. In an exemplary embodiment, a cooling fluid (e.g., water) enters the outlet tube 30 at some point prior to a gasifier, typically at a high flow rate. The cooling fluid may then expand as it circulates about body 32 to an input end of the outlet tube 30. This creates a significant amount of pressure. Accordingly, an exemplary embodiment of outlet tube 30 may be capable of withstanding at least 10 bar, more preferably at least 15 bar. However, unless otherwise specified, some exemplary embodiments of an outlet tube may have lower pressure thresholds.

This example of outlet tube 30 may also include means to reinforce the tube and/or to facilitate maintenance of the tube. For instance, this embodiment includes at least one stiffener (i.e., gusset) 130 to reinforce body 32. At least one stiffener 130 may include at least one lift hole 132 to facilitate lifting and removal of the distal section of the tube such as for maintenance. In this embodiment, each stiffener 130 extends from distal flange 36 to flange 140, which facilitates connection to the proximal section of outlet tube 30. Additionally, the stiffeners are radially situated around body 32. In other embodiments, a stiffener or stiffeners may have other suitable configurations. This exemplary embodiment further includes at least one drain port 150 in fluid communication with channel 110, which acts as a breather for facilitating drainage of the cooling fluid when not in use or for maintenance. This exemplary embodiment may also include at least one sensor 160 for monitoring the process or the condition of the equipment. In this example, sensor 160 is a thermal probe situated on outer wall 48 and may be in communication with channel 110. Sensor 160 may be used such as for monitoring the temperature of the outlet tube 30 or the process conditions. An embodiment of a system may also include sensor(s) at any other position on the outlet tube or any other component of the system (e.g., an auger system, an isolation gate, etc.).

FIGS. 25 and 26 show an exemplary embodiment of a proximal section of outlet tube 30. The proximal section may include features similar to the distal section. In this embodiment, a cooling fluid is adapted to flow into inlet port 170, which is in fluid communication with channel 110. The cooling fluid then exits through outlet port 172, which is also in fluid communication with channel 110. At least one stiffener 174 may reinforce the proximal section. Similar to the distal section, a stiffener 174 may extend from flange 176, which facilitates connection to the distal portion, to flange 34. A stiffener may have other suitable configurations in other exemplary embodiments. To facilitate removal of the proximal section such as for maintenance, at least one stiffener 174 may include at least one lift hole 178. Also, an exemplary embodiment may include at least one drain port 180 to facilitate drainage of the cooling fluid such as for maintenance or when not in use.

Figure 27:
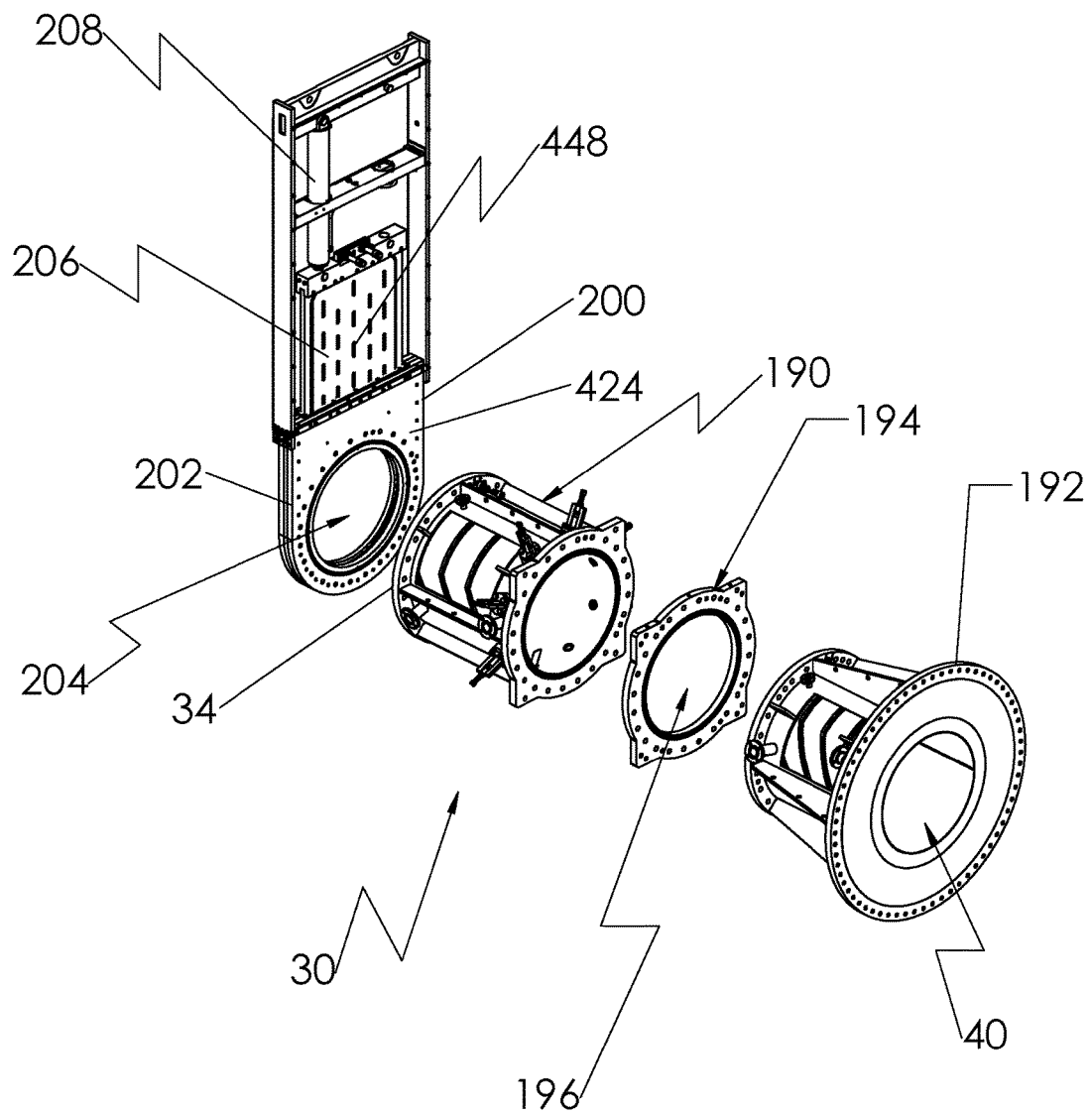
FIG. 27 is a perspective view of exemplary embodiments of the outlet tube and isolation gate of FIG. 1 in disconnected form (with portions not shown for clarity).

FIG. 27 shows an example of the outlet tube 30 of FIG. 1 in disconnected form. In this exemplary embodiment, the proximal section 190 (which is adapted to receive a feedstock material into outlet tube 30) is connected to the distal section 192 (which is adapted to allow a feedstock material to exit outlet tube 30) by a jacking ring 194. The jacking ring 194 may define an opening 196 that substantially matches up with the openings of the proximal and distal sections to enable flow of the feedstock material. Moreover, in addition to facilitating the connection of the proximal and distal sections, jacking ring 194 may also act as a spacer. When jacking ring 194 is removed, space is created that facilitates the removal of the proximal section 190 or distal section 192 such as for maintenance. However, some exemplary embodiments may not include a jacking ring or may include a jacking ring having a different configuration. In embodiments that do not include a jacking ring, a proximal portion may be directly connected to a distal portion.

The isolation gate 200 of FIG. 1 is also shown in FIG. 27. In this exemplary embodiment, isolation gate 200 is located between screw extrusion system 20 and outlet tube 30 to facilitate their connection. However, in some embodiments, a screw extrusion system may be directly connected to an outlet tube. Similar to jacking ring 194 in this embodiment, isolation gate 200 may have a frame 202 that defines an opening 204. In an exemplary embodiment, opening 204 extends through frame 202 and substantially corresponds with opening 40 of outlet tube 30 to facilitate flow of the feedstock material. However, in the event of certain situations, isolation gate 200 may include a blade 206 that is associated with frame 202 such that blade 206 is adapted to close opening 204. For example, in a gasification system, blade 206 may be closed such as for maintenance functions, power shut downs, and/or tube burn back protection (e.g., to prevent burning of feedstock material back through the screw extrusion system). Blade 206 may also reopen opening 204 such as after the clearance of the event that triggered the closing.

In this exemplary embodiment, blade 206 is equipped to operate with a hydraulic system or power source 208. One example of a hydraulic system 208 may include an emergency hydraulic accumulator that is adapted to operate blade 206 in the event of a power outage. In an exemplary embodiment, hydraulic system 208 is adapted to cause blade 206 to shear through any feedstock material when closing in order to isolate screw extrusion system 20 from outlet tube 30. Other types of power sources may be used in other embodiments to operate a blade. For instance, while a hydraulic system may be particularly useful in this embodiment, other types of drives may be used in some other embodiments to operate a blade. For example, some other embodiments may use a motor (e.g., an electric motor) to operate a blade.

FIGS. 28-31 show an exemplary embodiment of a system 300 that may be substantially similar to the aforementioned embodiments. As such, system 300 may include a cooling system such as previously described. In this example, a cooling fluid (e.g., water) is adapted to flow from a conduit 302 to an inlet port of the outlet tube. The cooling fluid circulates about or around the distal section of the outlet tube and then flows through conduit 304, which provides a fluid path from an outlet port of the distal section of the tube to an inlet port of the proximal section of the tube. The cooling fluid next circulates about or around the proximal section of the outlet tube and then exits through an outlet port. After exiting the output port, the cooling fluid may be discharged or it may be put to further use. In this exemplary embodiment, the outlet port of the proximal section of the outlet tube is in fluid communication with isolation gate 400. The cooling fluid may then also cool isolation gate 400. In particular, isolation gate 400 may include a blade that is substantially similar to blade 206 of the previous embodiment. In this embodiment, the cooling fluid may flow through at least one conduit to isolation gate 400. For example, the cooling fluid may enter a conduit 306. At least a portion may then be stripped off by a conduit 308, which flows into inlet port 402 of isolation gate 400. The cooling fluid may then circulate through the blade and then back out through outlet port 404 of isolation gate 400. A conduit 406 connected to outlet port 404 may discharge the cooling fluid or direct it to another destination (e.g., a tank for reuse).

While this embodiment places isolation gate 400 in fluid communication with the outlet tube, an isolation gate in other exemplary embodiments may not be in fluid communication with the outlet tube. An isolation gate in such embodiments may have an independent flow of cooling fluid. Furthermore, an isolation gate and/or outlet tube of some embodiments may not include a cooling system.

Figure 32:
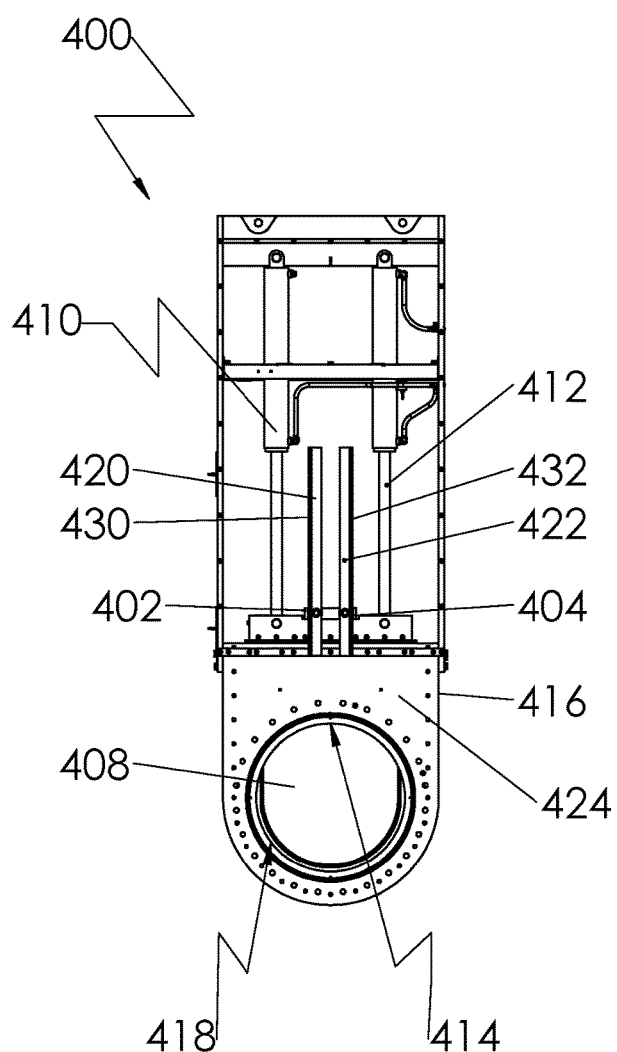
FIG. 32 is a side elevation view of an exemplary embodiment of the isolation gate of FIG. 28 (with a portion of a side wall not shown for clarity).
Figure 33:
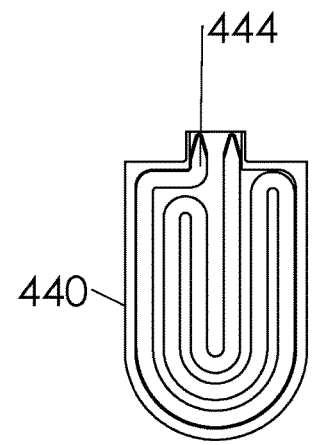
FIG. 33 is a side elevation view of an exemplary embodiment of a first plate of a blade of the isolation gate of FIG. 32.
Figure 34:
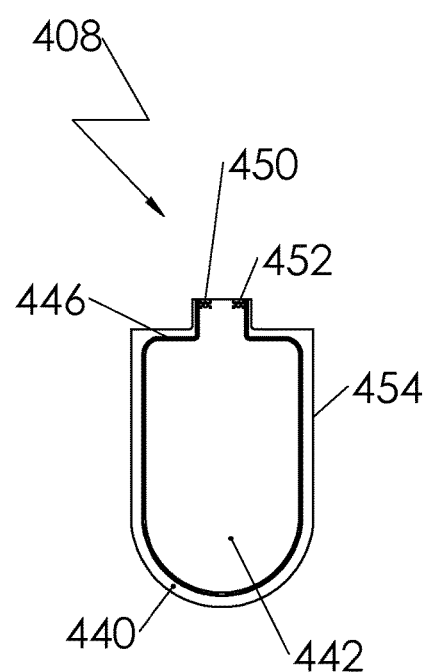
FIG. 34 is a side elevation view of an exemplary embodiment of a blade of the isolation gate of FIG. 32.

FIGS. 32-34 show further features of an exemplary embodiment of isolation gate 400. FIG. 32 depicts blade 408 in a closed position. In this embodiment, blade 408 is operated by a hydraulic power source that comprises hydraulic piston 410 and hydraulic piston 412, which are adapted on command to lower blade 408 into its closed position and raise blade 408 into its open position. The use of two pistons facilitates balanced movement of blade 408, but other embodiments may comprise only one piston or more than two pistons. In this embodiment, at least one piston is secured between blade 408 and frame 416 (e.g., as shown in FIG. 32). While a hydraulic power source is particularly beneficial for a vertical configuration of isolation gate 400, other embodiments may comprise a different power source (e.g., a motor) or configuration. For example, in some other embodiments, a drive may be associated with the blade in a different configuration. In order to adjust between its open (e.g., see FIG. 27) and closed positions (e.g., see FIG. 32), blade 408 may move along a path 414 defined frame 416. More particularly, in this embodiment, path 414 extends between a proximal wall 424 and a distal wall 425 of frame 416. In some embodiments, however, a path defined by a frame may not be enclosed within the frame. In this example, path 414 is contiguous with opening 418, each of which are defined by frame 416, such that blade 40 is adapted move within path 414 to go between an open position and a closed position. As previously described, feedstock material may flow through opening 418 to an outlet tube when blade 408 is not in the closed position. In this example, distal wall 425 may be connected to a feeder system such that the feeder system is adapted to feed a material through opening 418 when blade 408 is in an open position, and proximal wall 424 may be connected to an outlet tube such that the outlet tube is adapted to receive the material fed through opening 418.

Figure 28:
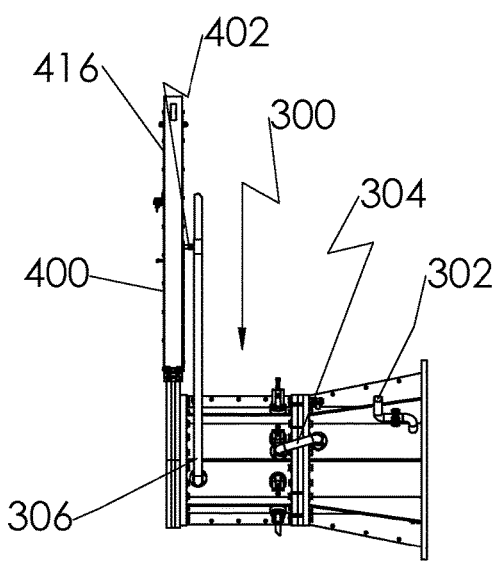
FIG. 28 is a side elevation view of an exemplary embodiment of a system for extruding material.
Figure 29:
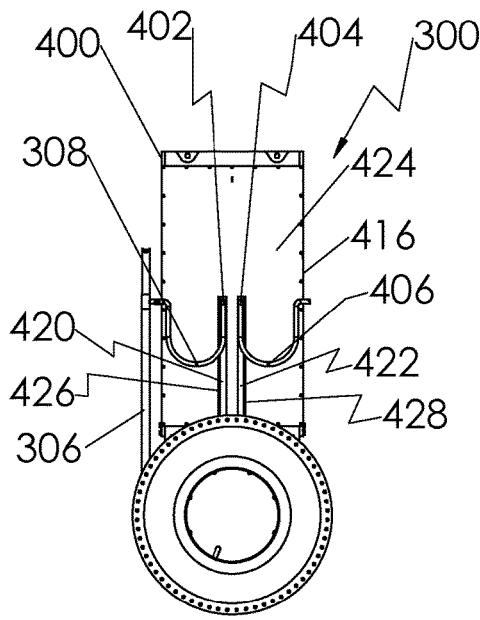
FIG. 29 is an end elevation view of the system of FIG. 28.
Figure 30:
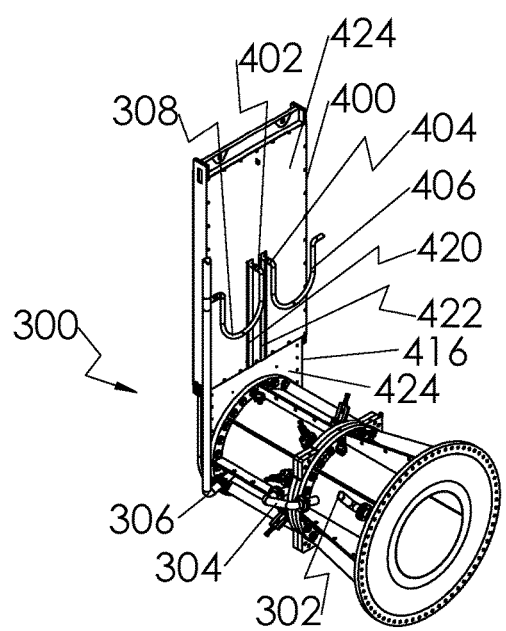
FIG. 30 is a perspective view of the system of FIG. 28.
Figure 31:
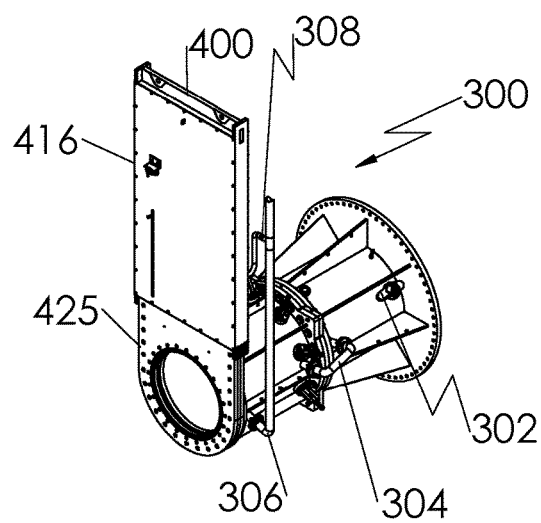
FIG. 31 is a perspective view of the system of FIG. 28.

An exemplary embodiment of gate 400 is substantially vertical (e.g., as shown in FIG. 28). In such an embodiment, a plane of blade 408 is substantially in line with opening 418. More particularly, a plane of blade 408 is vertically in line with opening 418 such that blade 408 is situated above opening 418 when in an open position. In addition, pistons 410 and 412 are in line with a plane of blade 408 and opening 418 in this embodiment. In other words, the axis of each of pistons 410 and 412 is vertically in line with a plane of blade 408 and opening 418 such that the pistons 410 and 412 are situated above blade 408 and opening 418. Such an embodiment further promotes a vertical configuration that may save essential space such as in a system facility. Furthermore, in an exemplary embodiment, blade 408 may have a thickness of 3 inches or less, and frame 416 may have a thickness of 7 inches or less, which may further add to such benefits. In fact, in an exemplary embodiment, blade 408 may have a thickness of 2 inches or less, and frame 416 may have a thickness of 6 inches or less. Despite the advantages of such embodiments, other embodiments may have different configurations (e.g., non-vertical or angular configurations) and dimensions (e.g., larger dimensions).

Blade 408 is adapted to receive a flow of cooling fluid. Accordingly, blade 408 is in fluid communication with inlet port 402 and outlet port 404. In this embodiment, inlet port 402 and outlet port 404 are in fluid communication with conduit 420 and conduit 422, respectively, which are in fluid communication with blade 408. Conduit 420 provides a fluid path for a flow of cooling fluid into blade 408. The cooling fluid may circulate in channel 444 of blade 408 and then exit from blade 408 into conduit 422. The cooling fluid may then be directed into conduit 406 from outlet port 404.

Inlet port 402 and outlet port 404 extend through or out beyond the front or proximal wall 424 of frame 416 for ease of accessibility from the outlet tube. Inlet and outlet ports may be accessible from any other suitable locations on an isolation gate in other exemplary embodiments. Slots 426 and 428, which are defined by wall 424 of frame 416, allow for travel of inlet port 402 and outlet port 404, respectively, relative to wall 424 when blade 408 moves between its open and closed positions. In particular, inlet port 402 extends through slot 426, and outlet port 404 extends through slot 428. Other embodiments may have the inlet and outlet ports in a different location (e.g., inlet and outlet ports may be situated within a frame that comprises a panel or door to allow for access). In this embodiment, conduit 420 is slidably engaged or associated with a track 430, and conduit 422 is slidably engaged or associated with a track 432. As blade 408 moves between its open and closed positions, conduits 420 and 422 glide along tracks 430 and 432, respectively.

FIGS. 33 and 34 show an exemplary embodiment of blade 408. In this example, blade 408 is comprised of a main plate 440 and a capping plate 442. A channel 444 is formed between main plate 440 and capping plate 442, which allows for a flow of cooling fluid through the blade. In this example, such as shown in FIG. 33, main plate 440 defines a channel 444 that facilitates a flow of cooling fluid about blade 408. Such as shown in FIG. 33, channel 444 may wind around blade 408 such that substantially all of a portion of said blade that is adapted to close opening 418 is adapted to be cooled by the fluid. More particularly, in this example, substantially all of blade 408 is adapted to be cooled by the fluid. In other embodiments, a channel may be formed in another manner between a first plate and a second plate or may have another configuration to facilitate another cooling pattern. Also, some embodiments may not comprise a cooling channel. In this embodiment, plate 442 caps channel 444. Capping plate 442 may be connected to main plate 440 such as by a weld 446. As shown in FIG. 27, additional welds 448 may be made such as between or around channel 444 for additional securement. In this example, capping plate 442 has smaller outer dimensions than plate 440. As a result, plate 440 defines the outer side edge 454 of blade 408 around a main portion of channel 444, which provides desired structural characteristics to handle the stress caused by a flow of cooling fluid through channel 444. In some other exemplary embodiments, the plates may have another configuration. For example, a capping plate may have larger outer dimensions than a main plate in some embodiments. To enable a flow of cooling fluid, blade 408 further includes an inlet 450 that is in fluid communication with conduit 420 for receiving the cooling fluid and an outlet 452 that is in fluid communication with conduit 422 for facilitating an exit of the cooling fluid. In this example, inlet 450 and outlet 452 extend through capping plate 442, particularly an upper portion of capping plate 442 to facilitate connection with conduits 420 and 422. An inlet and outlet may be formed in another suitable portion of blade 408 (e.g., a main plate) in other exemplary embodiments. Regardless of location, inlet 450 and outlet 452 are in fluid communication with channel 444 such that cooling fluid is adapted to enter blade 408 through inlet 450, circulate through channel 444, and then exit blade 408 through outlet 452.

In this embodiment, blade 408 may effectively serve as a pressure vessel. Blade 408 (e.g., a hydraulic operating system) may be in communication with at least one sensor (e.g., sensor 160) and/or a control system (e.g., control system 460 in FIG. 4). As a result, for example, blade 408 may close in response to a power interruption or undesirable heat conditions. In an exemplary embodiment, the system may anticipate that blade 408 will be receiving the full heat of a gasifier at its face. During such periods, a cooling fluid may be circulated through blade 408 at a high rate, which requires blade 408 to serve as a pressure vessel. An exemplary embodiment of blade 408 may be capable of withstanding at least 10 bar, more preferably at least 15 bar. Such pressure vessel characteristics are particularly surprising and beneficial in light of the aforementioned exemplary dimensions of blade 408 and frame 416. Nevertheless, some exemplary embodiments of a blade may have lower pressure thresholds or different dimensions, unless otherwise specified.

While this exemplary embodiment of an isolation gate may be particularly useful in a gasification system, exemplary embodiments of an isolation gate may also be used in other types of systems. For example, exemplary embodiments of an isolation gate may be used in this and other types of material delivery systems having different purposes (e.g., other than gasification). Exemplary embodiments may also be used for other type of systems for isolating or separating an area.

Figure 35:
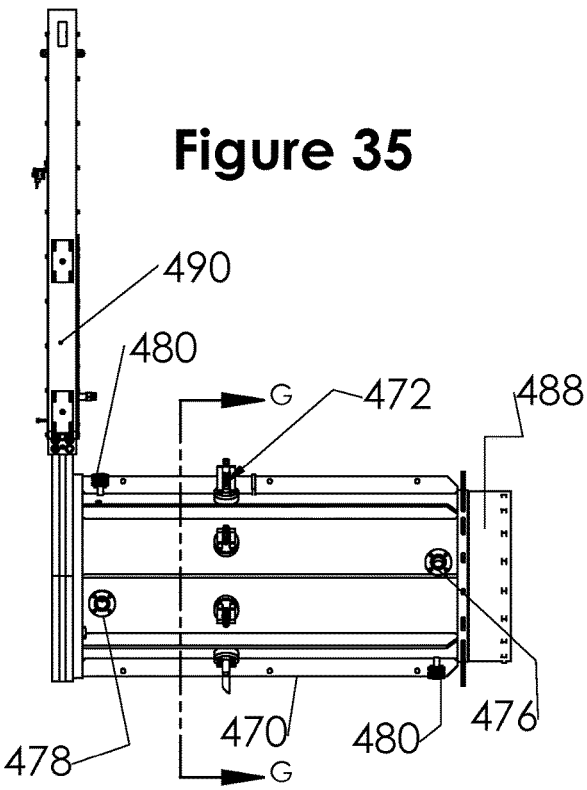
FIG. 35 is a side elevation view of another exemplary embodiment of an outlet tube and isolation gate.
Figure 36:
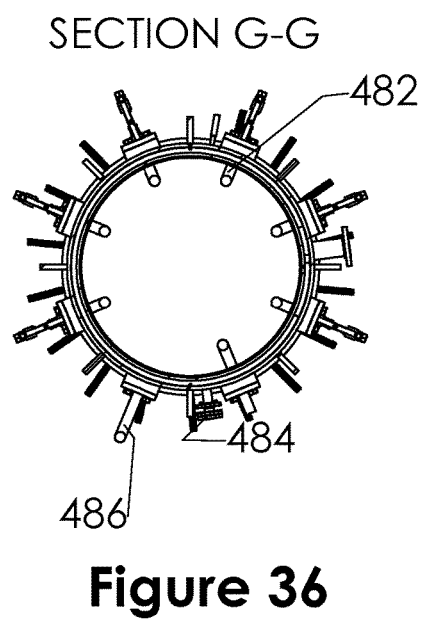
FIG. 36 is a cross-sectional view of the outlet tube of FIG. 35 along line G-G.
Figure 37:
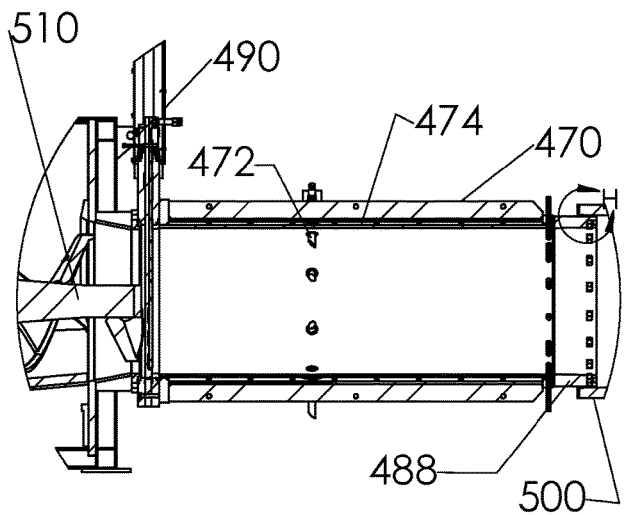
FIG. 37 is a partial cross-sectional view of the outlet tube and isolation gate of FIG. 35 connected to exemplary embodiments of a screw extrusion system and a gasifier.

FIGS. 35-37 show various views of an example of another embodiment of an outlet tube 470 that is connected to an isolation gate 490. Outlet tube 470 and isolation gate 490 may have many of the same features as the previously described embodiments of an outlet tube and isolation gate, respectively. For example, outlet 470 comprises restrictors (adjustable and/or stationary) 472, a channel 474 for cooling, a cooling inlet port 476, a cooling outlet port 478, and drain breather ports 480. As compared to previously described embodiments, this exemplary embodiment of outlet tube 470 is distinct in that the tube is unitary instead of being easily dividable into a proximal section and a distal section. FIG. 36 shows a view of a majority of the restrictors 472 extending radially inward from an inner wall of the body into the opening of the tube. In particular, adjustable restrictors 482 and a fixed restrictor 484 are shown extending radially into a proximal portion of the tube, and fixed restrictor 486 is shown in a substantially flush position with respect to the inside diameter of the tube. In other embodiments, restrictors may extend inwardly into the opening other than in a radial configuration.

Figure 38:
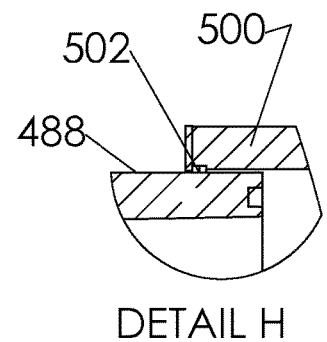
FIG. 38 is a detailed view of section H of FIG. 37.

This embodiment of outlet tube 470 is also distinct from previous embodiments in that the distal end comprises a refractory tip 488. An example of refractory tip 488 may be comprised of a refractory material including, but not limited to, a ceramic material. FIG. 37 shows an example of refractory tip 488 inserted into a gasifier inlet 500, and a proximal end of outlet tube 470 is connected to a screw extrusion system comprising a screw 510. Such as shown in FIG. 38, refractory packing material 502 may assist with a substantially airtight connection between the outside diameter of refractory tip 488 and the inside diameter of gasifier inlet 500. A particular benefit of refractory tip 488 is that it may allow for axial movement of outlet tube 470 relative to gasifier inlet 500, which may be induced by the gasification process. Previously described embodiments of an outlet tube may also include a refractory tip instead of an attachment flange. Conversely, other exemplary embodiments of a unitary outlet tube may include an attachment flange such as previously described instead of a refractory tip.

In any of the aforementioned embodiments, material may be initially provided in any suitable manner. An example of an initial delivery system adapted for use in a gasification system is shown in FIGS. 1-4. In this embodiment, the system comprises a drop chute 600 adapted to provide material to auger feeder 20. A slide gate 602 is adapted to open to allow material to enter drop chute 600 and adapted to close to provide a substantially airtight seal to auger feeder 20. On the other hand, a slide gate 604 is adapted to open to allow material to exit drop chute 600 and enter auger feeder 20. Thereafter, slide gate 604 is adapted to close to provide a substantially airtight seal to auger feeder 20. Other embodiments may implement other suitable initial delivery systems.

FIGS. 39-48 show additional exemplary embodiments of systems adapted to deliver material to a gasifier. Such embodiments may implement any features of the foregoing embodiments of the inventions described herein.

FIGS. 39-42 show an exemplary embodiment of a system for processing (in this example) municipal solid waste (MSW). An example of this embodiment may include features similar to those described with respect to FIGS. 1-4. In this embodiment, pre-shredded MSW is fed into at least one auger feeder, which serves to densify the pre-shredded material and deliver it to a feed conveyor. More particularly, such as in this exemplary embodiment, two auger feeders 700, 702 per processing line may be utilized to provide redundancy in the event one of the feeders requires service. In this scenario, the second feeder may facilitate the processing of double the normal volume of material. Other exemplary embodiments may include only one feeder or more than two feeders. In this example, each auger feeder 700, 702 may have a side outlet, which may be associated with a track, channel, conduit, of other suitable transfer mechanism, to facilitate transfer of the output material to the feed conveyor. In this example, auger feeder 700 is associated with a track 704, and auger feeder 702 is associated with a track 706.

An example of feed conveyor 708 may be a belt conveyor that is inclined at an angle. While this exemplary embodiment is particularly useful for transferring material in an efficient manner, other embodiments may implement another suitable type of conveyor including, but not limited to, a screw conveyor. Once the material is fed to the conveyor 708, it may be delivered to an infeed hopper 710. In this embodiment, below the infeed hopper 710 may be a drop chute 712 with slide gate/airlock doors above 714 and below 716 that may serve to stage material in the event that a nitrogen purge/fire suppression system is required. Drop chute 712 may also be considered to comprise infeed hopper 710 and the airlock comprising gates 714, 716.

As the material passes the second slide gate/airlock 716, it may enter a processing chamber of a primary auger feeder 718. In an exemplary embodiment, the auger feeder 718 then further densifies the material and may force the product into a water cooled tube 720, such as previously described herein. In this example, between the feeder 718 and water cooled tube 720 may be a 'fail safe' isolation gate such as previously described that serves to protect the system in the event of a feeder or gasifier shutdown. As the material passes through the water cooled tube 720, it may further densify and create a plug of material in an exemplary embodiment. The plug of material may protect the inside walls of the water cooled tube 720 and the feeder 718 from excess heat exposure from a gasifier, which may be associated with tube 720. The material may pass through the water cooled tube 720 and through a nozzle on a gasifier, where the material may then be utilized as a fuel source.

Referring back to the example of FIG. 17, multiple primary feeders (e.g., three) may be used to provide redundancy in the event that one of the processing lines requires service. When this occurs, two processing lines may increase production, allowing for no drop in total volume of material processed in an exemplary embodiment. If necessary, such as shown in the example of FIG. 4, an embodiment of a feeder screw of this embodiment may be placed in a withdrawn position such as for maintenance.

Figure 43:
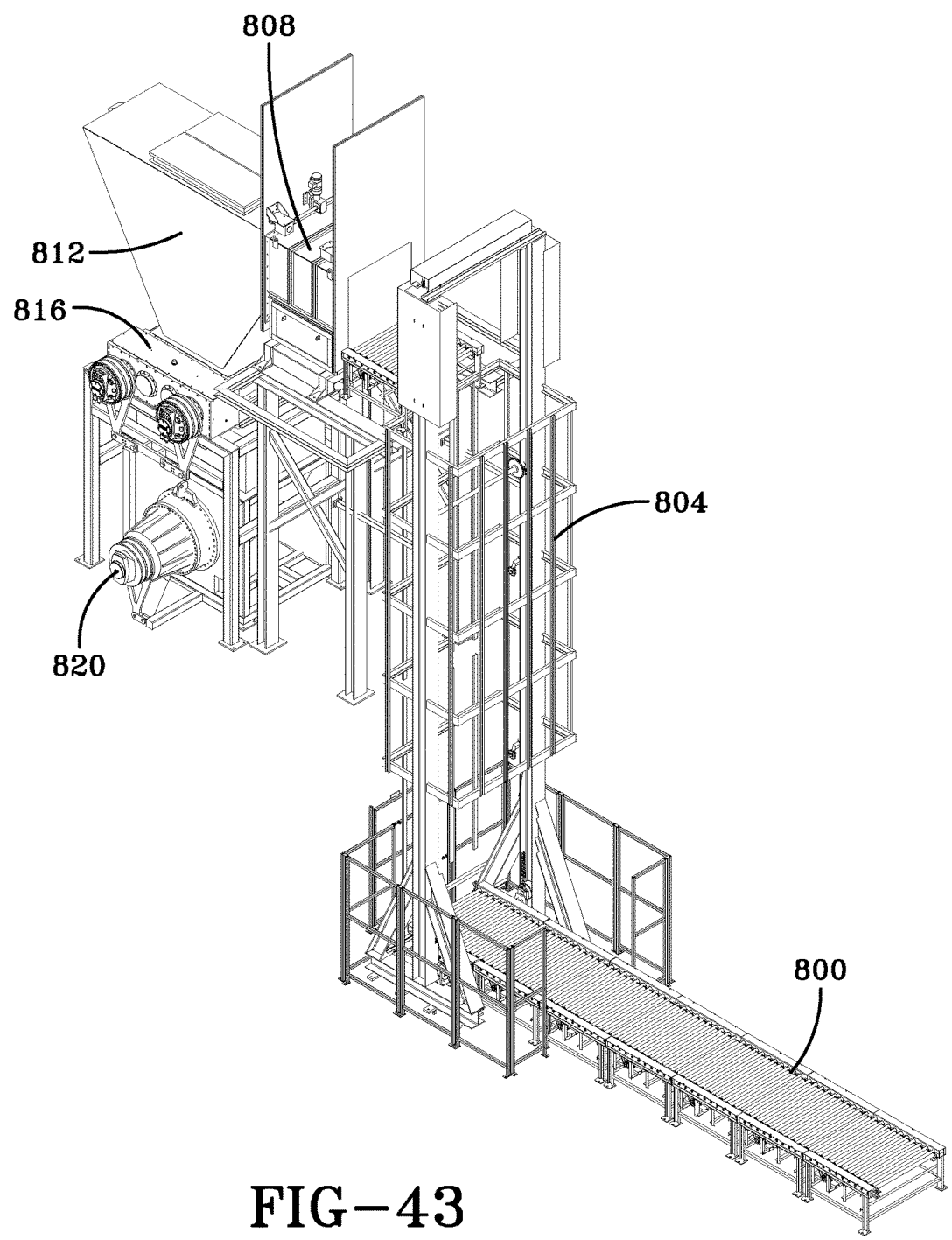
FIG. 43 is a perspective view of an exemplary embodiment of a system for delivering material to a gasifier.
Figure 44:
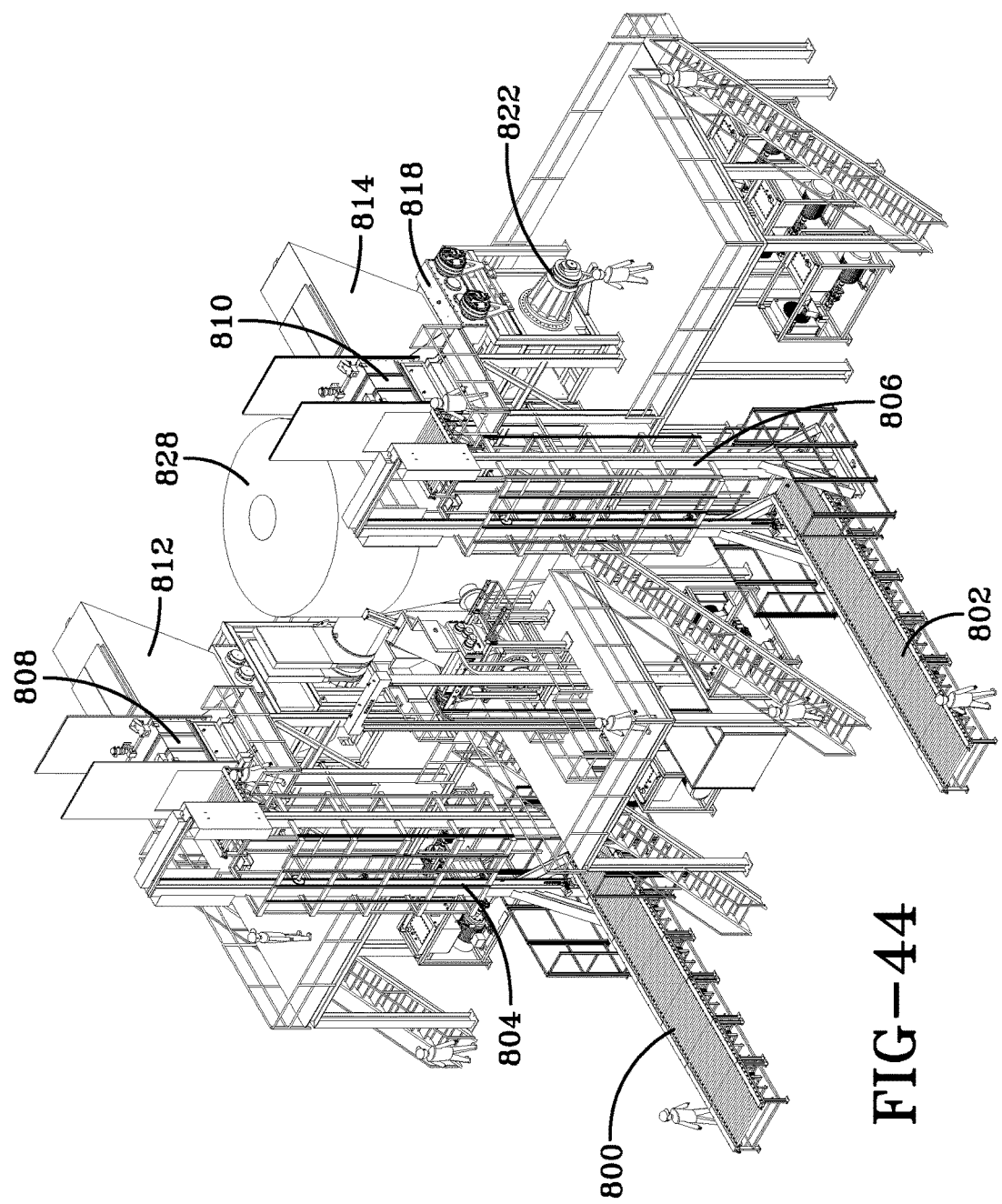
FIG. 44 is a perspective view of an exemplary embodiment of a system that utilizes two embodiments of the system of FIG. 43.
Figure 45:
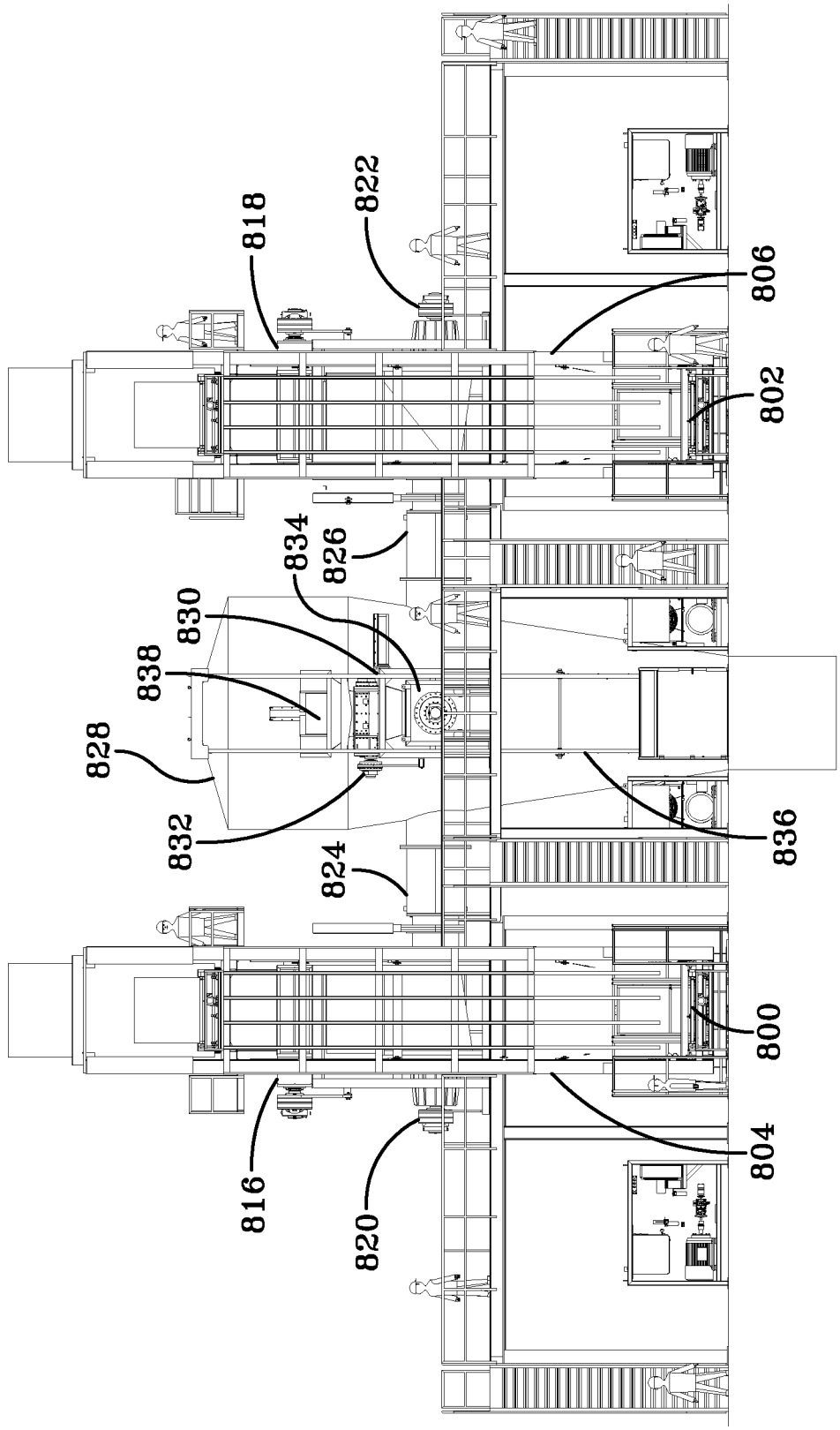
FIG. 45 is a side elevation view of the system of FIG. 44.

FIGS. 43-45, which will be described in unison, show examples of a system that may be used for processing MSW. Other types of material may also be processed in other examples. In this example, 55 gallon drums or totes may be loaded onto at least one powered roller conveyor 800. FIG. 44 shows an example with two staging sets of powered roller conveyors 800, 802. Other suitable types of conveyors may be used in other embodiments. In this embodiment, the drums may then be respectively fed into a vertical reciprocating conveyor 804, 806, which respectively lift the product to an airlock 808, 810 containing a conveyor (e.g., a powered roller conveyor) with doors/gates that may utilize inflatable seals. A nitrogen purge may be an option on an exemplary embodiment of the system, along with fire suppression. Once the product passes through the airlock 808, 810, it is respectively delivered to a sealed infeed hopper 812, 814, which may include ram assist. In this embodiment, each infeed hopper 812, 814 may be respectively mounted to a primary shear shredder 816, 818. The primary shear shredder 816, 818 then shreds the product which respectively discharges into an auger feeder 820, 822. In an exemplary embodiment such as previously described, the screw feeder 820, 822 may then densify the material as it respectively forces the product into a water cooled tube 824, 826. Between the feeder 820, 822 and water cooled tube 824, 826 may be a 'fail safe' isolation gate that serves to protect the system in the event of a feeder or gasifier shutdown. As the material respectively passes through the water cooled tube 824, 826, it may further densify and create a plug of material. In an exemplary embodiment, this plug of material may protect the inside walls of the water cooled tube 824, 826 and the feeder 820, 822 from excess heat exposure from the gasifier 828. The material respectively passes through the water cooled tube 824, 826 and through a respective nozzle on the gasifier 828, where material may then be utilized as a fuel source.

In this example, two primary feeders 820, 822 may be used to provide redundancy in the event that one of the processing lines requires service. When this occurs, one processing line may increase production, allowing for no drop in total volume of material processed in an exemplary embodiment. As in the aforementioned embodiment, other embodiments may include only one feeder or more than two feeders.

Between the two MSW lines, there may be a shred feed line 830 used for processing a different waste stream such as shown most clearly in FIG. 45. In this exemplary embodiment, the shredder 832 and auger feeder 834 may, for example, be used to process batches of medical waste. An exemplary embodiment may operate in a similar manner to the aforementioned MSW lines, only in this case an airlock may not be required. A bin may enter the vertical reciprocating conveyor 836 and feed an infeed hopper 838, which may include a ram. In this example, the product may then enter a quad shredder 832 that passes a sized product into feeder 834. In an exemplary embodiment, the feeder 834 may then pass the product through an isolation gate and into a water cooled tube. From the water cooled tube, the densified plug may then enter the gasifier 828.

Figure 46:
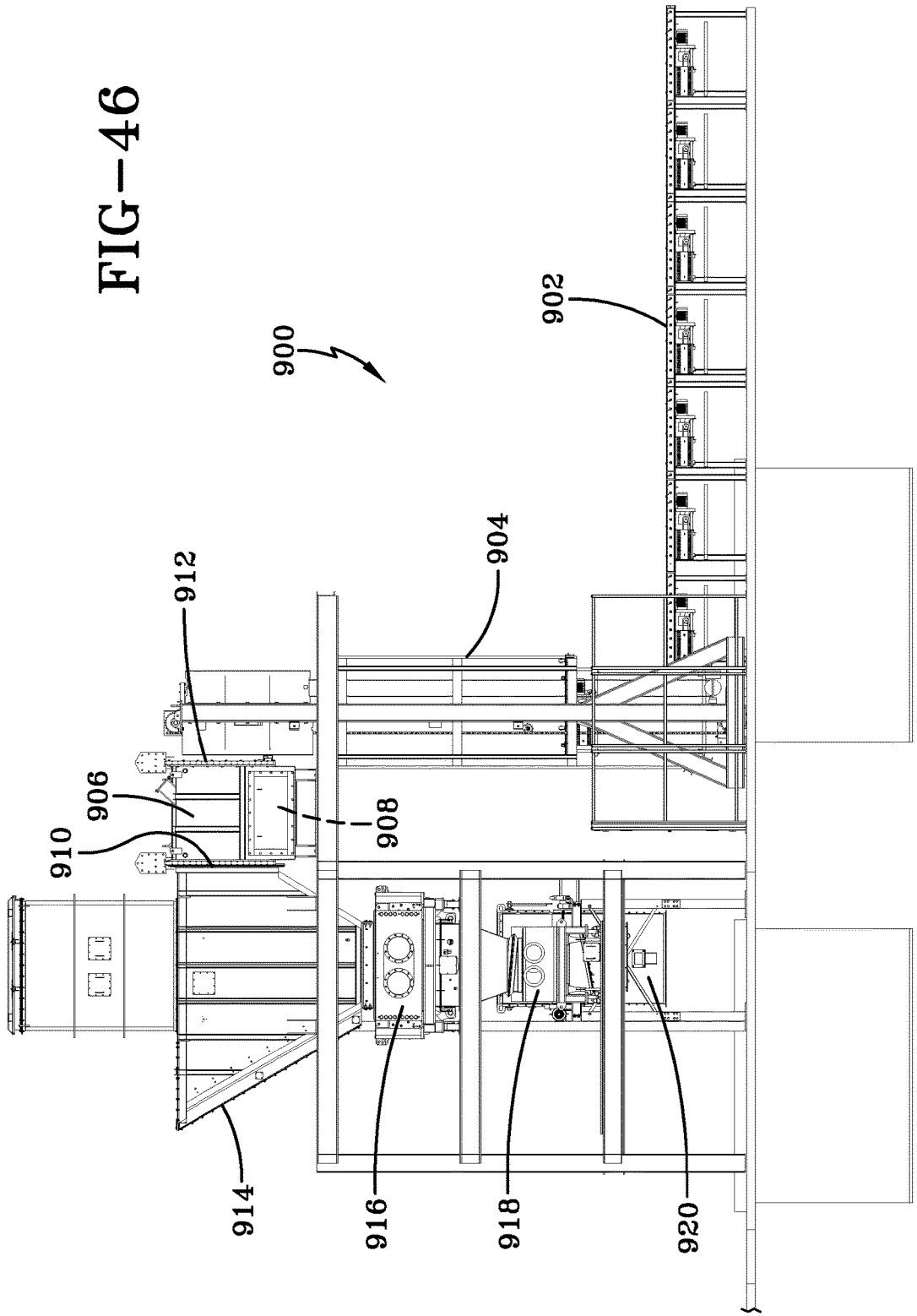
FIG. 46 is a side elevation view of an exemplary embodiment of a system for delivering material to a gasifier.
Figure 47:
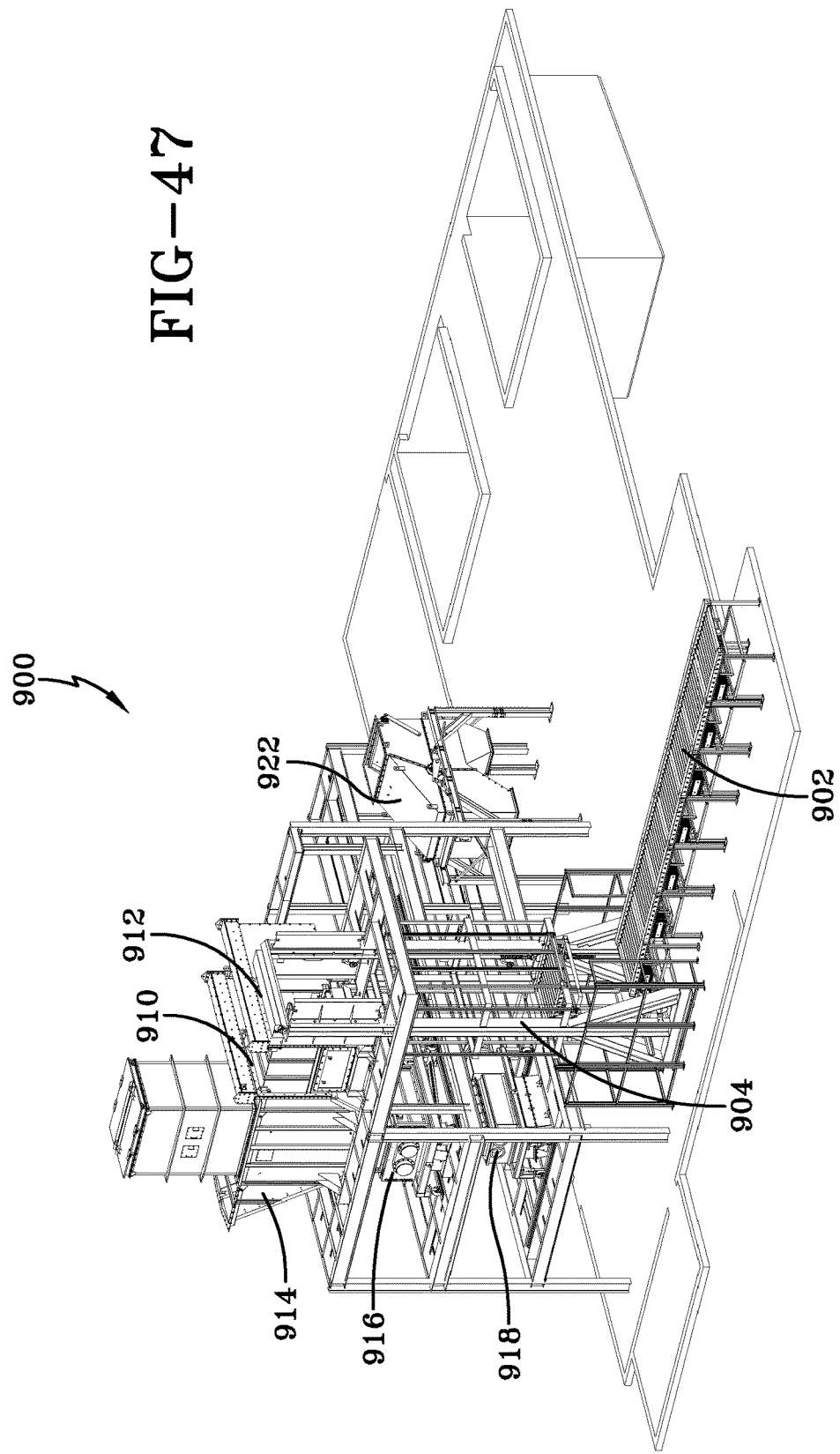
FIG. 47 is a perspective view of an exemplary embodiment of a system that utilizes the system of FIG. 46.
Figure 48:
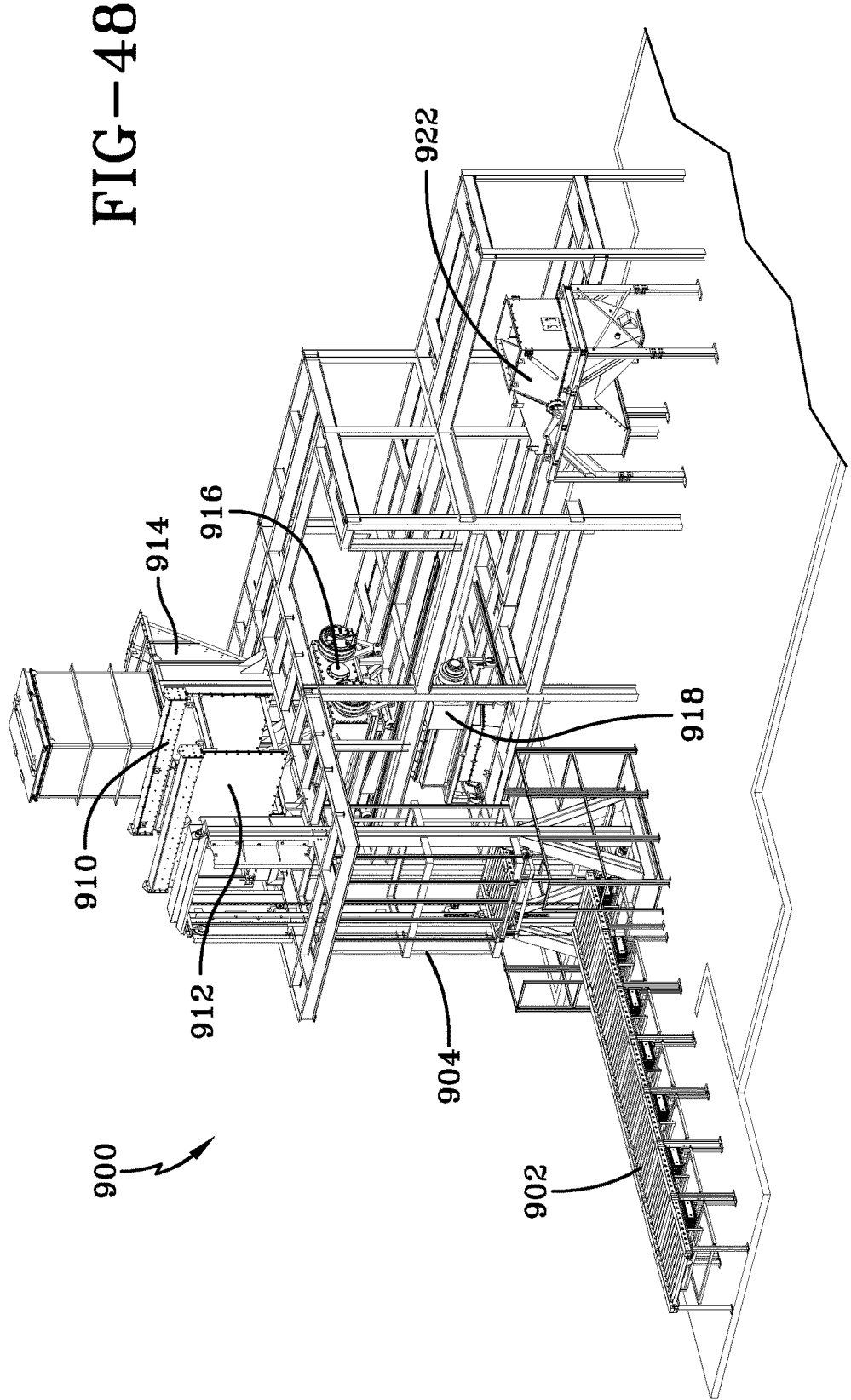
FIG. 48 is another perspective view of the system of FIG. 47.

FIGS. 46-48 show examples of a system 900 that may be used to process various products (e.g., palletized 55 gallon drums and 300 gallon totes containing hazardous waste). The product to be processed is loaded onto at least one conveyor 902 (e.g., a staging set of powered roller conveyors). The product may then be fed into the vertical reciprocating conveyor 904, which lifts it to an airlock 906. The material discharges from the vertical reciprocating conveyor 904 into the airlock 906, which may contain a conveyor 908 (e.g., a powered roller conveyor) and doors 910, 912 that may utilize inflatable seals. In an exemplary embodiment, the airlock 906 may be offered with both nitrogen purge and fire suppression systems. Once the product is staged in the airlock 906, the internal airlock door 910 may be opened and the product may be delivered to a sealed infeed hopper 914, which may include ram assist. In this embodiment, the infeed hopper 914 may be mounted directly above a primary shear shredder 916. The primary shear shredder 916 may then shred the product, which may discharge into a secondary shear shredder 918. In this example, the secondary shear's main function may be to process the product into a finer piece size. In an exemplary embodiment such as shown in FIG. 46, the product may be transferred from the secondary shredder 918 to an auger feeder 920 that is adapted to feed a gasifier. In another exemplary embodiment, the product may be discharged onto a screw conveyor or other suitable conveyor that may deliver the product to a drum magnet 922, which may separate ferrous from non-ferrous materials. Upon discharging from the drum magnet 922, each waste stream may be delivered via conveyor (e.g., a belt or screw conveyor such as shown in FIGS. 39-45) or other transfer means for additional processing.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A system for processing material for a gasifier, said system comprising:
a first auger feeder adapted to receive and process material to be gasified;
an inclined conveyor adapted to receive said material processed by said first auger feeder, said conveyor adapted to transfer said material;
a second auger feeder positioned above said first auger feeder and adapted to receive said material transferred by said conveyor, said second auger feeder adapted to feed said material;
a tube connected to said second auger feeder such that said tube is adapted to receive said material from said second auger feeder, said tube comprising:
i) a body connected to said second auger feeder, said body having an inner wall that defines an opening adapted to receive said material from said second auger feeder such that said body is adapted to allow a flow of said material through said opening and out of said tube to said gasifier; and
ii) at least one restrictor that extends inwardly from said inner wall of said body into said opening, said at least one restrictor adapted to extend into said flow of said material to impede said flow, said at least one restrictor configured to enable said flow to flow around said at least one restrictor to exit out of said tube, wherein each said restrictor is adjustable such that a respective position of each said restrictor is adapted to be adjusted relative to said inner wall; and
a gasifier connected to said tube such that said gasifier is adapted to receive said material from said tube.

2. The system of claim 1 wherein said first auger feeder has a side outlet through which said processed material to be gasified is adapted to be output.

3. The system of claim 1 further comprising:
a third auger feeder adapted to receive and process material to be gasified;
said second auger feeder positioned above said third auger feeder;
wherein said conveyor is adapted to receive said material processed by said first auger feeder and said third auger feeder and transfer said material; and
wherein said second auger feeder is adapted to receive said material transferred by said conveyor from said first auger feeder and said third auger feeder.

4. The system of claim 3 wherein:
said first auger feeder has a side outlet through which said respective processed material to be gasified is adapted to be output; and
said third auger feeder has a side outlet through which said respective processed material to be gasified is adapted to be output.

5. The system of claim 1 wherein said conveyor is an inclined belt conveyor.

6. The system of claim 1 further comprising a drop chute adapted to receive said material transferred by said conveyor and then provide said material to said second auger feeder.

7. The system of claim 6 wherein said drop chute comprises:
an infeed hopper adapted to receive said material transferred by said conveyor; and
an airlock associated with said infeed hopper, said airlock comprising a first slide gate adapted to open to allow said material to enter airlock and adapted to close to provide a substantially airtight seal to said second auger feeder, and a second slide gate adapted to open to allow said material to exit said airlock to be received by said second auger feeder and then adapted to close to provide a substantially airtight seal to said second auger feeder.

8. The system of claim 1 wherein said body further comprises an outer wall such that a channel is formed between said inner wall and said outer wall that is adapted to circulate a fluid around said body for cooling.

9. The system of claim 1 wherein said at least one restrictor is adapted to cause said material to form a substantially airtight plug of said material in said tube as said material moves through said tube.

10. A system for processing material for a gasifier, said system comprising:
a first auger feeder adapted to receive and process material to be gasified;
an inclined conveyor adapted to receive said material processed by said first auger feeder, said conveyor adapted to transfer said material;
a second auger feeder positioned above said first auger feeder and adapted to receive said material transferred by said conveyor, said second auger feeder adapted to feed said material;
a tube connected to said second auger feeder such that said tube is adapted to receive said material from said second auger feeder, said tube comprising (a) a body connected to said second auger feeder, said body having an inner wall that defines an opening adapted to receive said material from said second auger feeder such that said body is adapted to allow a flow of said material through said opening and out of said tube to said gasifier, and (b) at least one restrictor that extends inwardly from said inner wall of said body into said opening, said at least one restrictor configured to extend into said flow of said material to impede said flow by causing said material to form a substantially airtight plug of said material in said tube as said material continues to move through said tube, wherein each said restrictor is adjustable such that a respective position of each said restrictor is adapted to be adjusted relative to said inner wall; and
a gasifier connected to said tube such that said gasifier is adapted to receive said material from said tube.

11. The system of claim 10 wherein said body further comprises an outer wall such that a channel is formed between said inner wall and said outer wall that is adapted to circulate a fluid around said body for cooling.

12. The system of claim 10 wherein said first auger feeder has a side outlet through which said processed material to be gasified is adapted to be output.

13. The system of claim 10 further comprising:
a third auger feeder adapted to receive and process material to be gasified;
said second auger feeder positioned above said third auger feeder;
wherein said conveyor is adapted to receive said material processed by said first auger feeder and said third auger feeder and transfer said material; and
wherein said second auger feeder is adapted to receive said material transferred by said conveyor from said first auger feeder and said third auger feeder.

14. The system of claim 13 wherein:
said first auger feeder has a side outlet through which said respective processed material to be gasified is adapted to be output; and said third auger feeder has a side outlet through which said respective processed material to be gasified is adapted to be output.

15. The system of claim 10 wherein said conveyor is an inclined belt conveyor.

16. The system of claim 10 further comprising a drop chute adapted to receive said material transferred by said conveyor and then provide said material to said second auger feeder.

17. The system of claim 16 wherein said drop chute comprises:
- an infeed hopper adapted to receive said material transferred by said conveyor; and
- an airlock associated with said infeed hopper, said airlock comprising a first slide gate adapted to open to allow said material to enter said airlock and adapted to close to provide a substantially airtight seal to said second auger feeder, and a second slide gate adapted to open to allow said material to exit said airlock to be received by said second auger feeder and then adapted to close to provide a substantially airtight seal to said second auger feeder.

* * * * *